Oct. 10, 1961  G. C. ELLERBECK  3,003,689
CALCULATING MACHINE
Filed Jan. 8, 1957  12 Sheets-Sheet 3
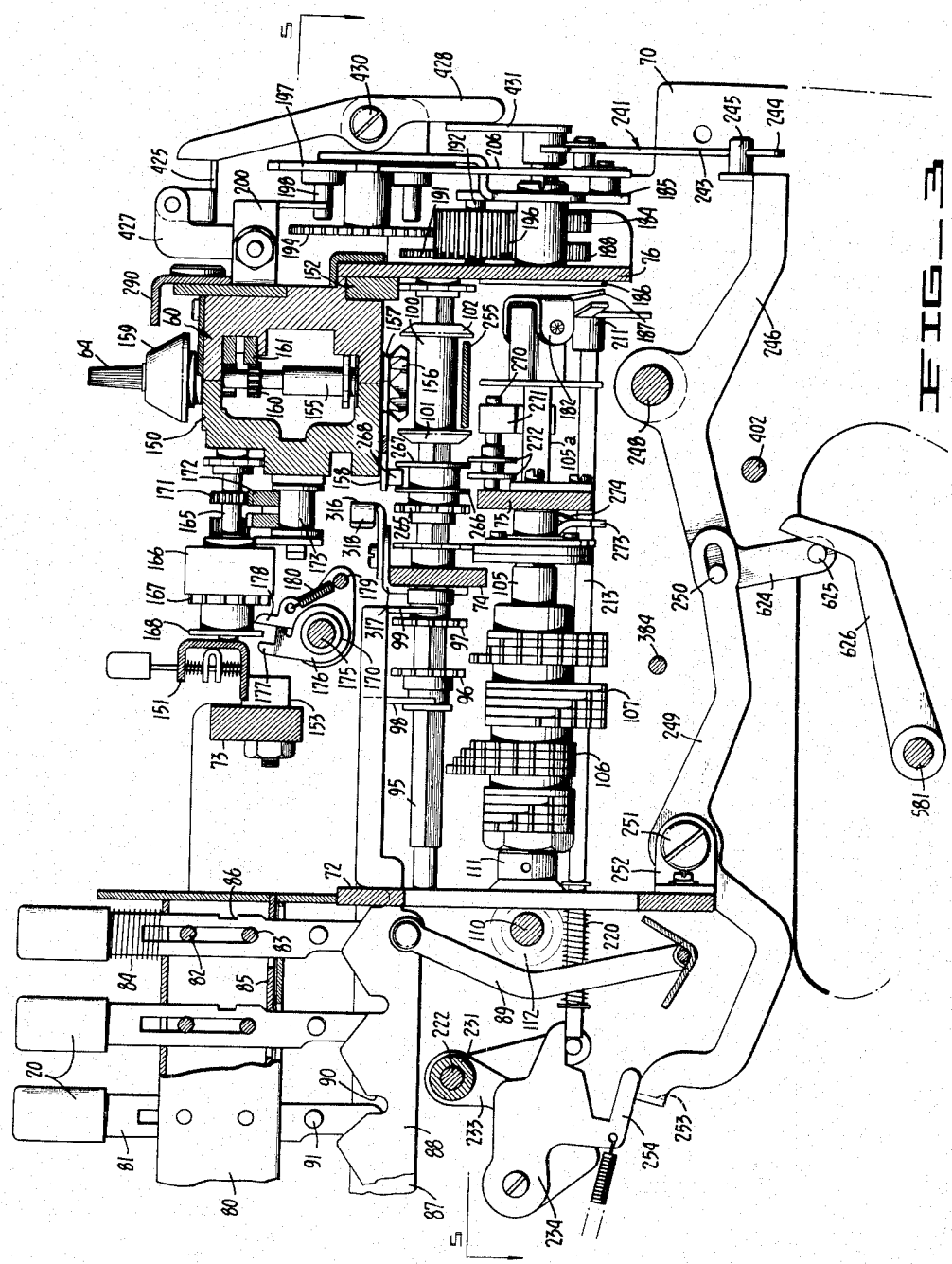
FIG_3

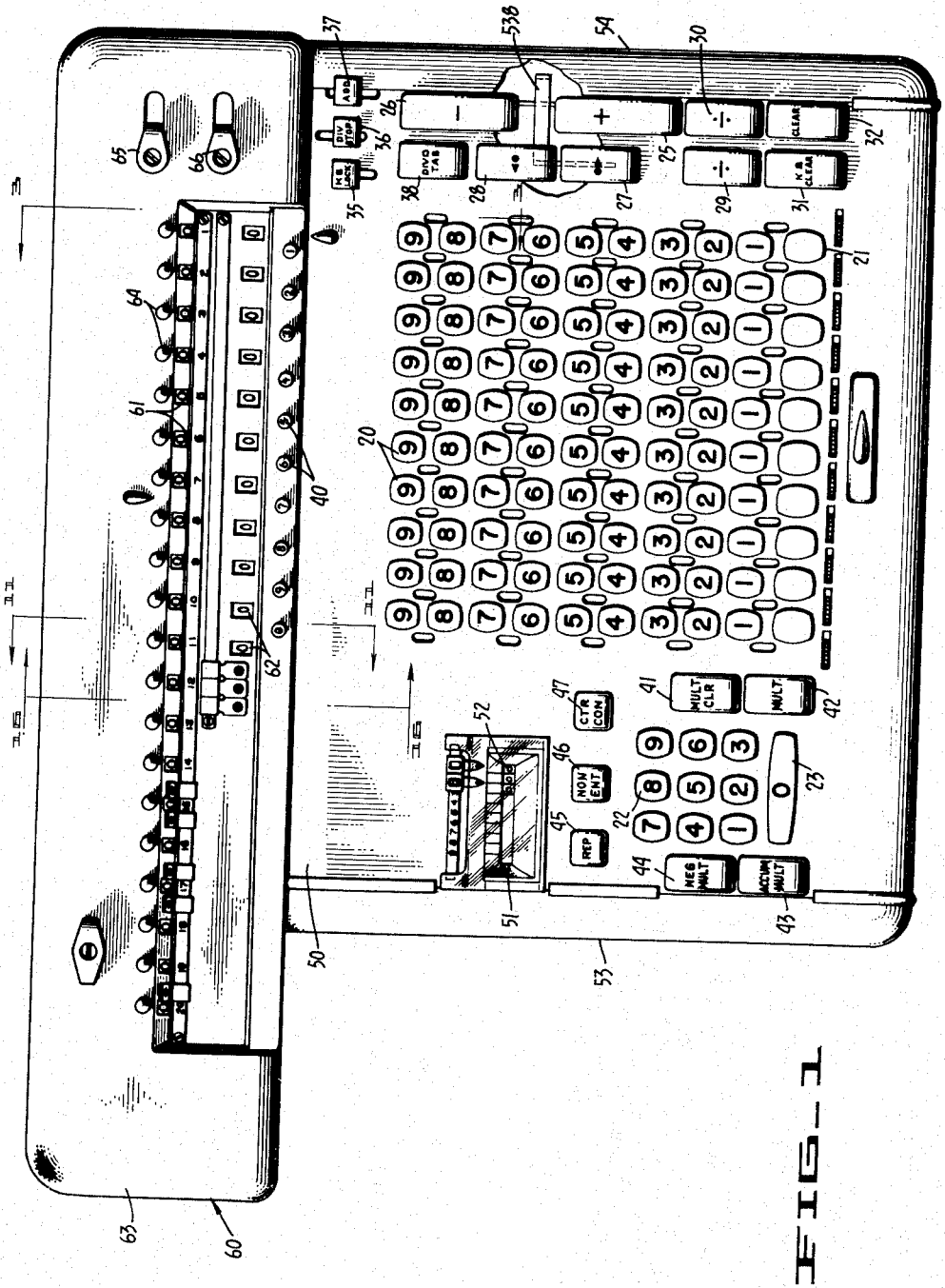
FIG_1

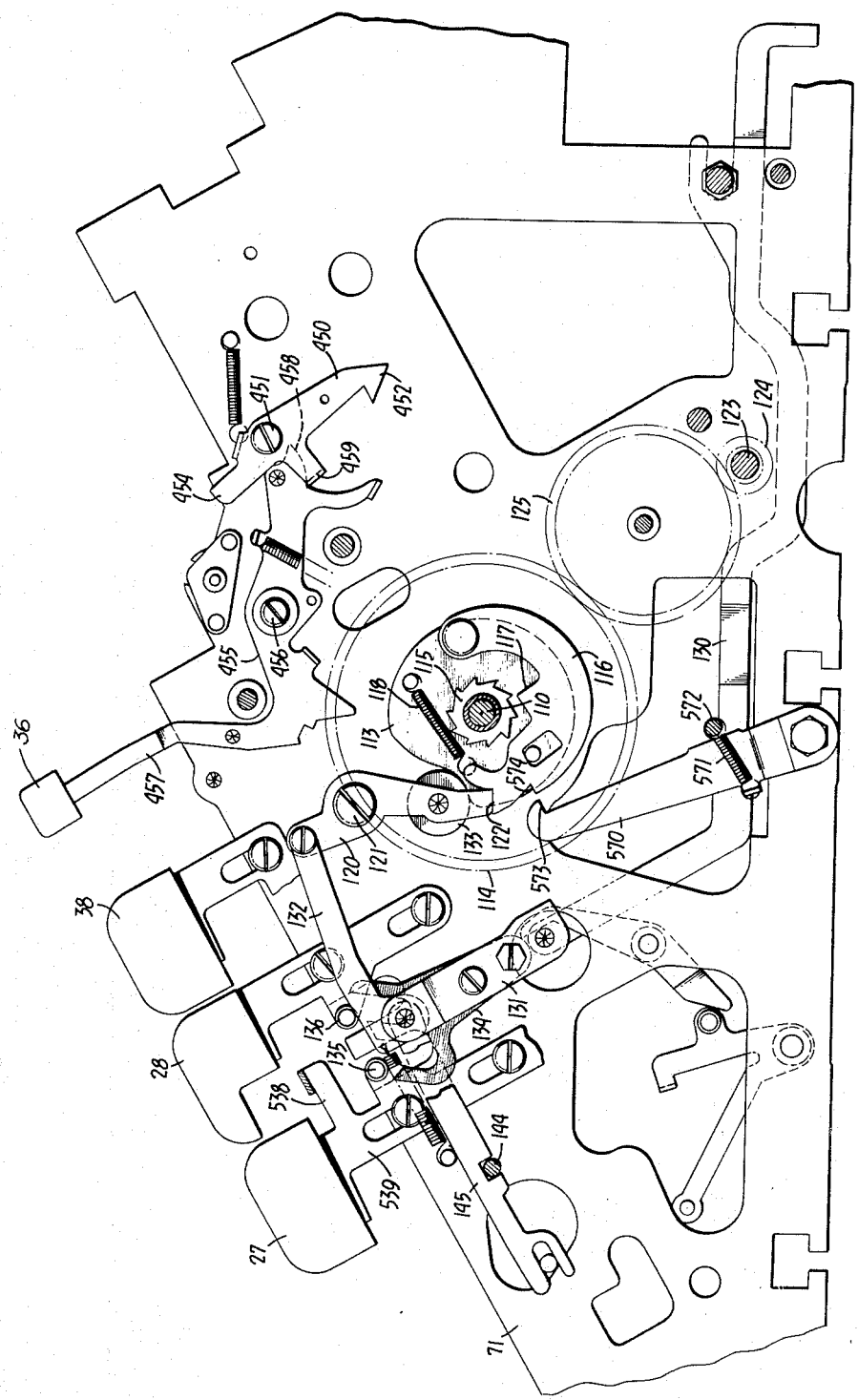

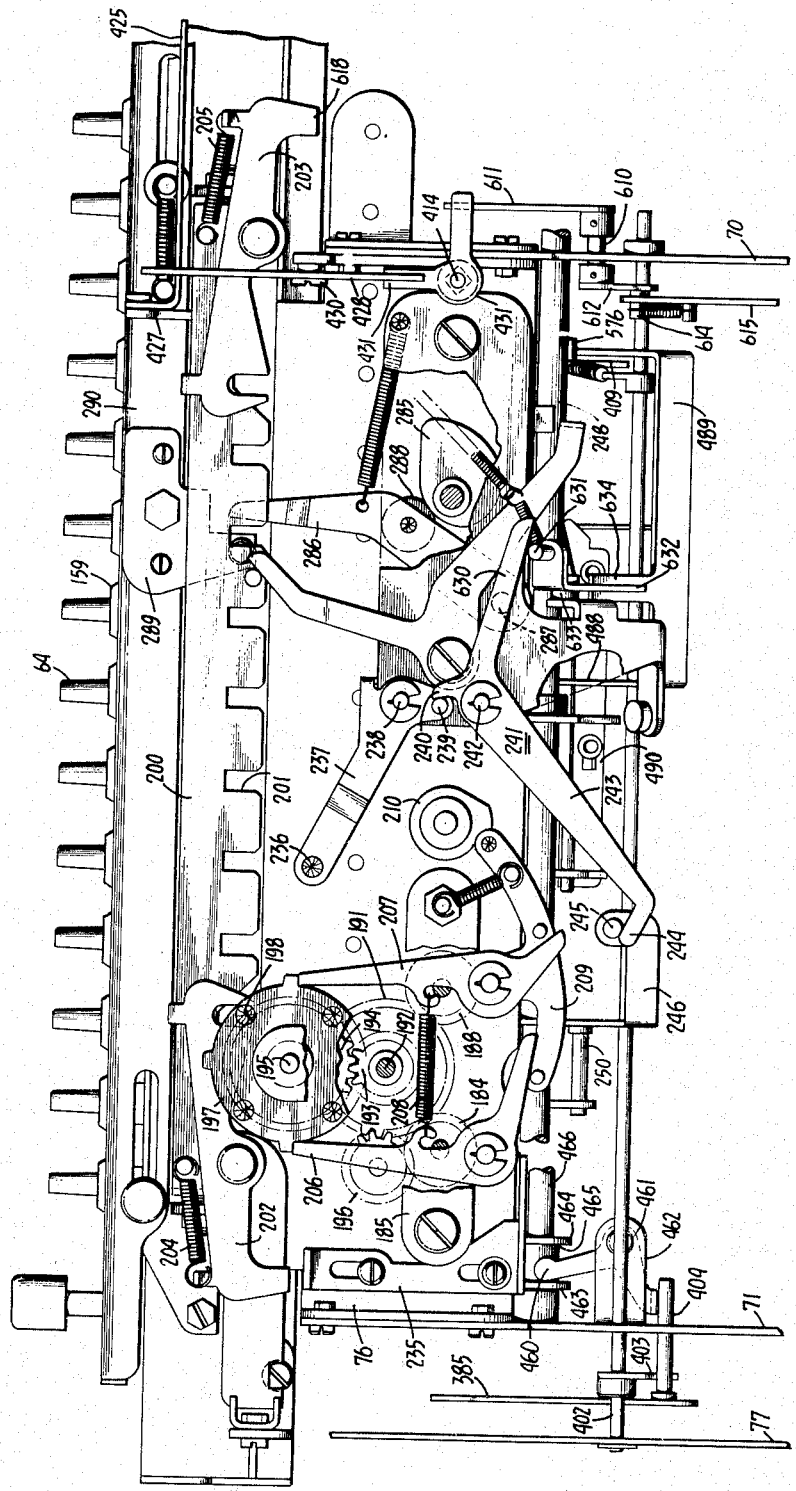

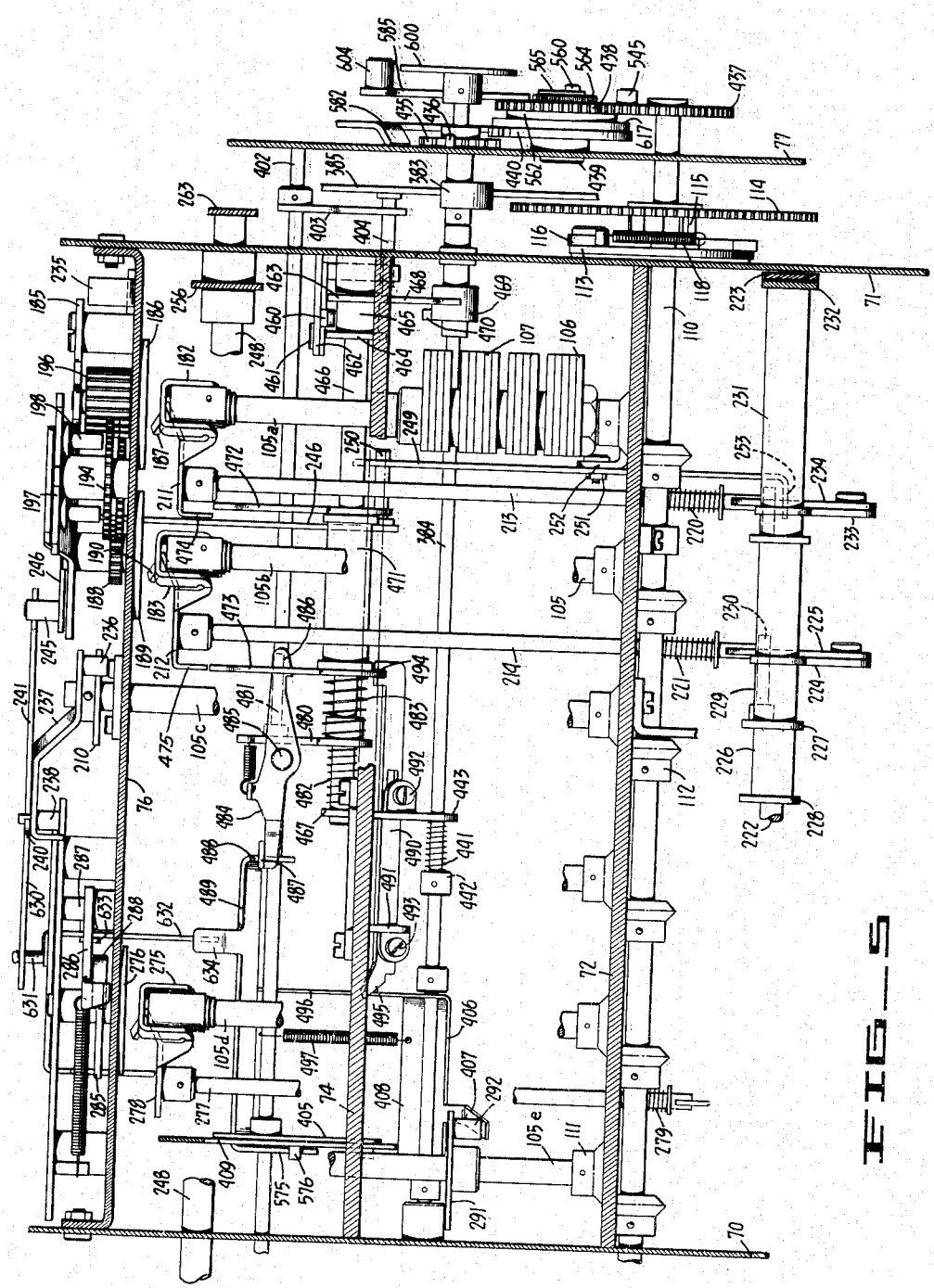

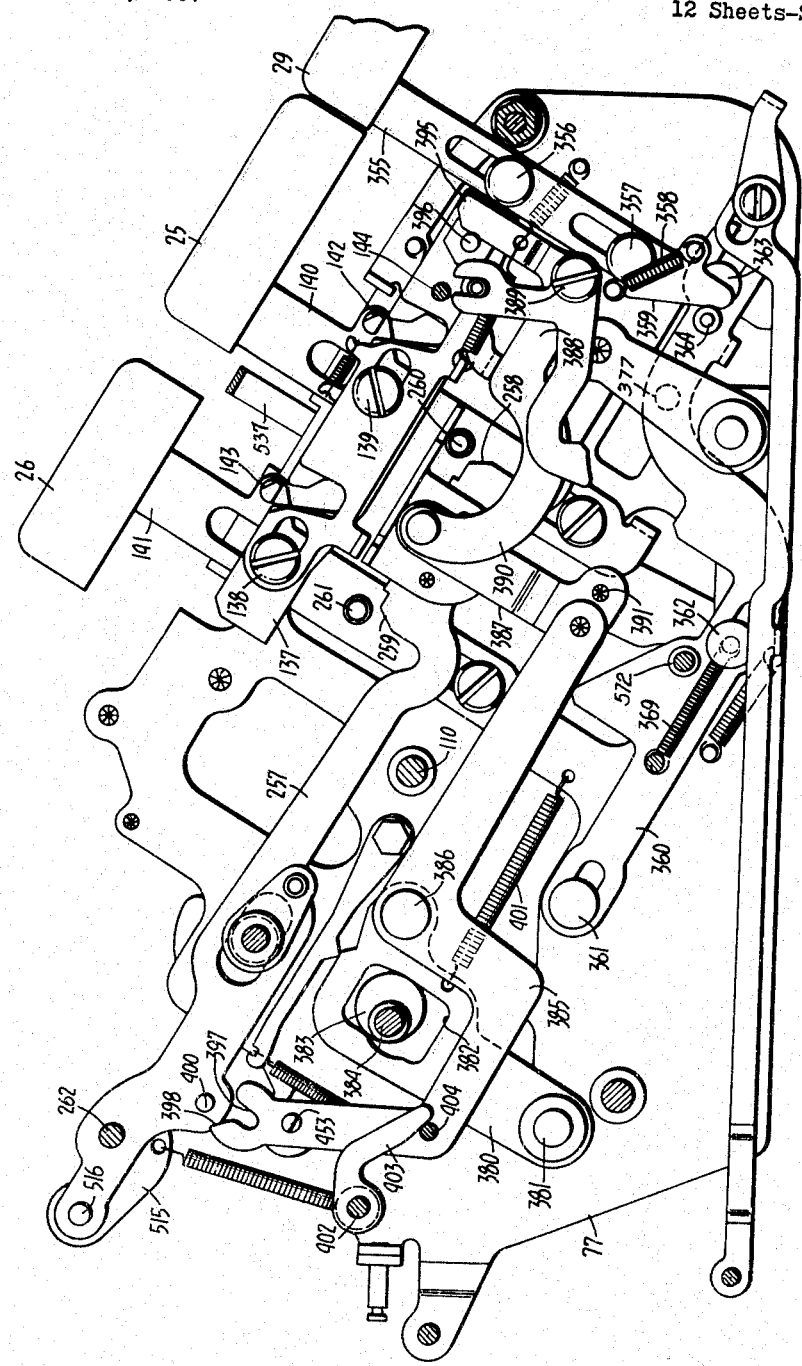

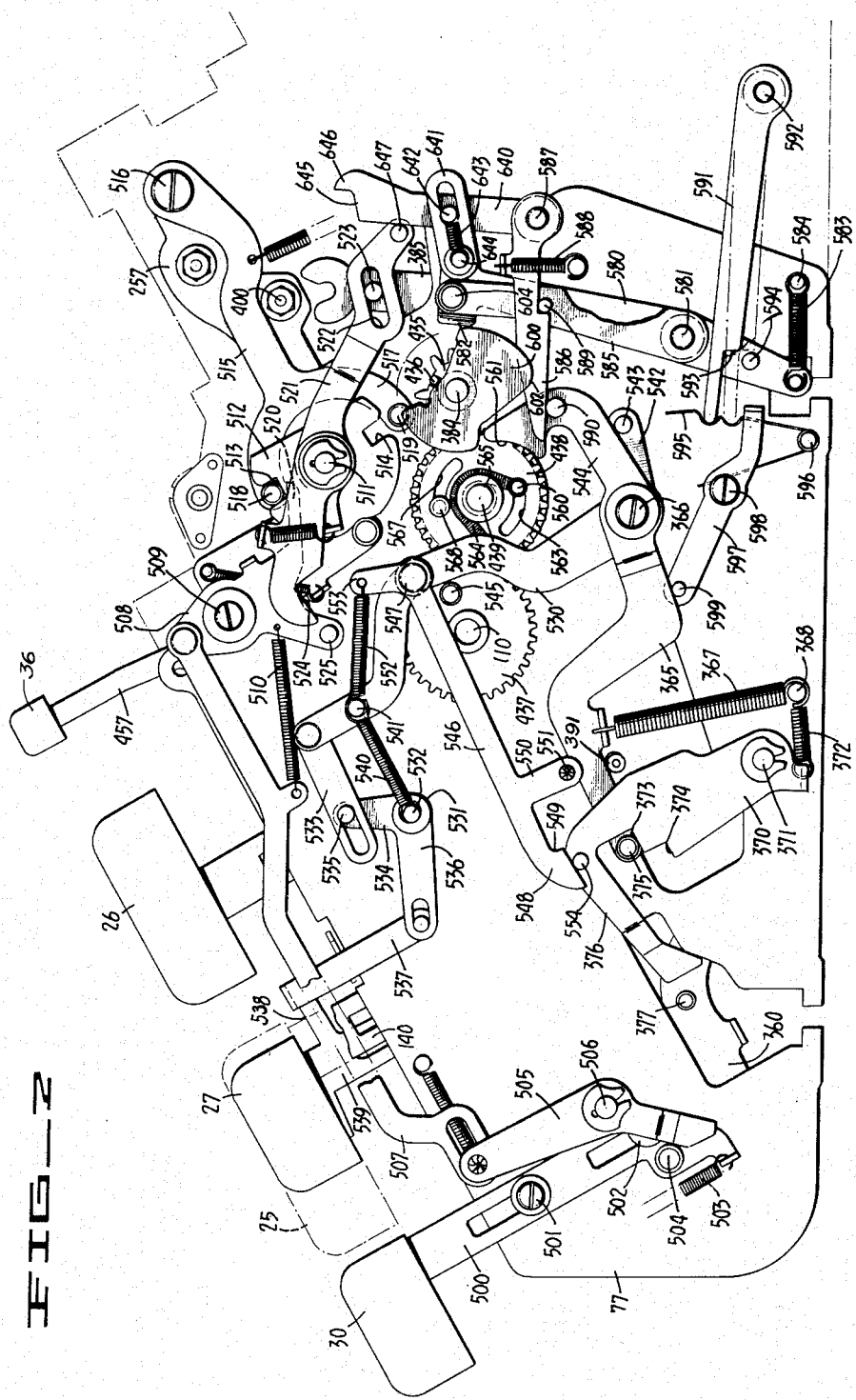

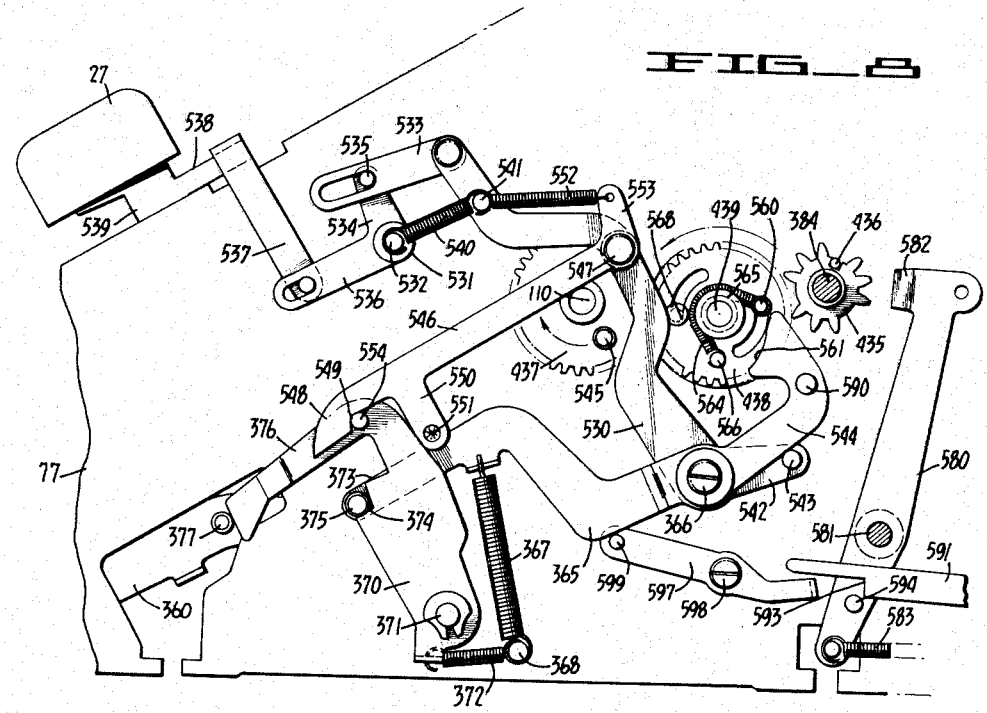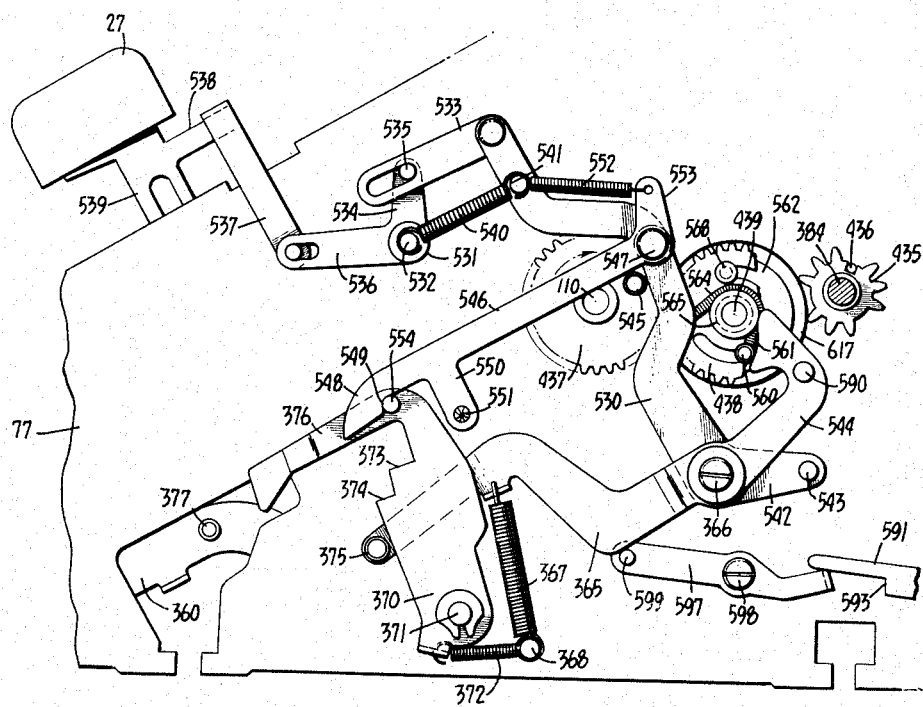

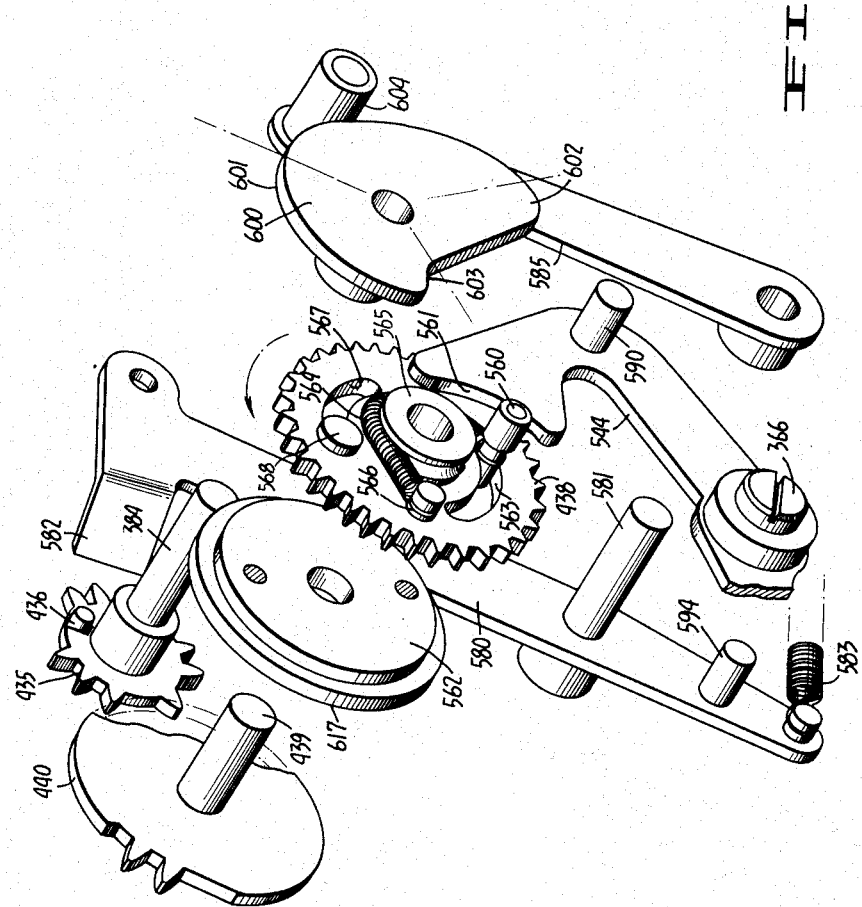

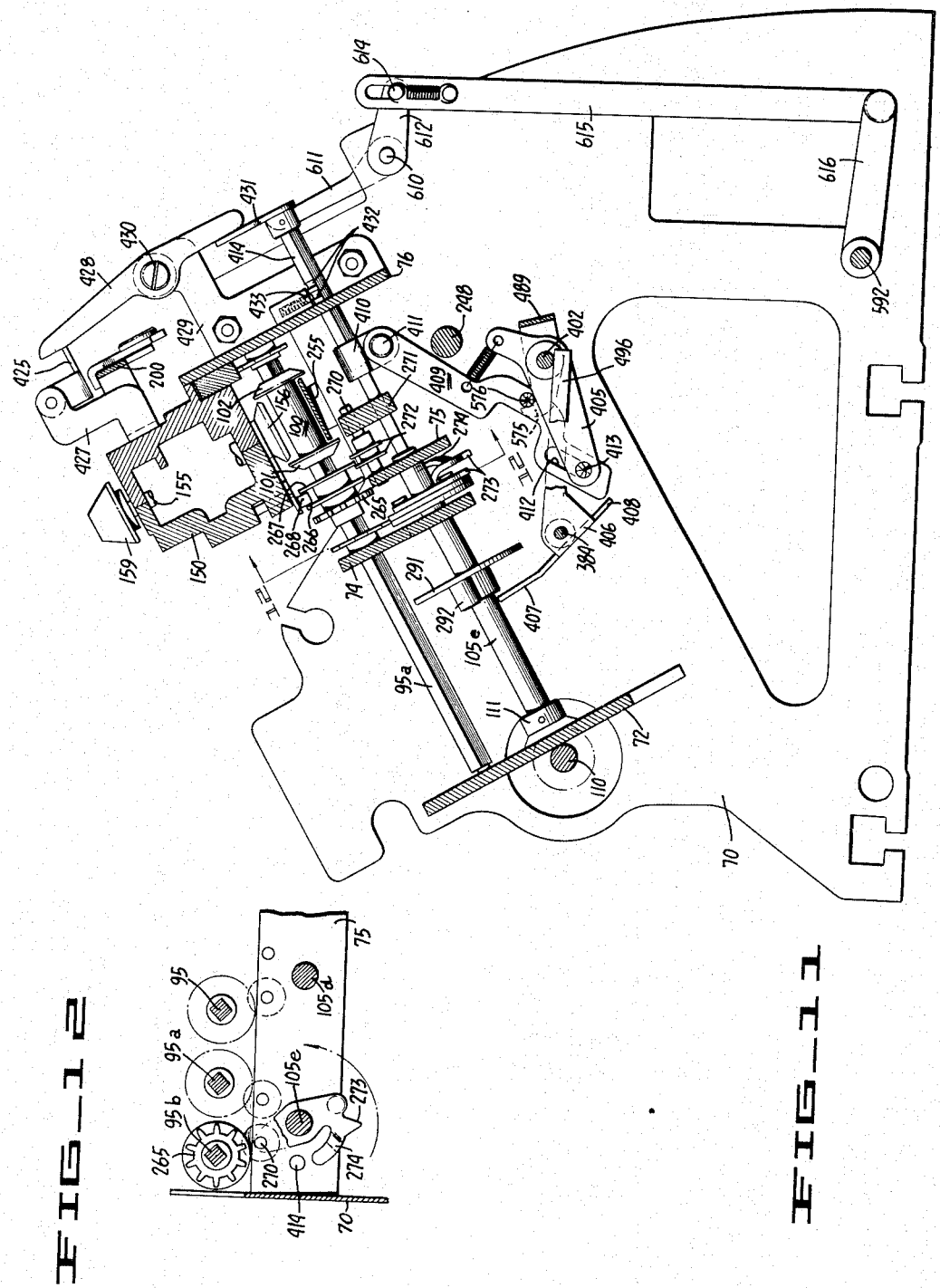

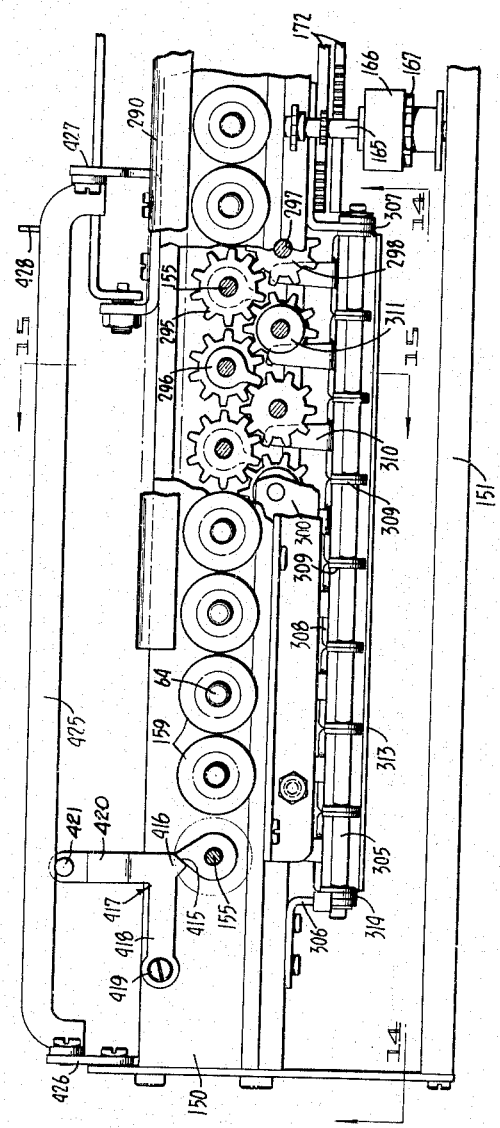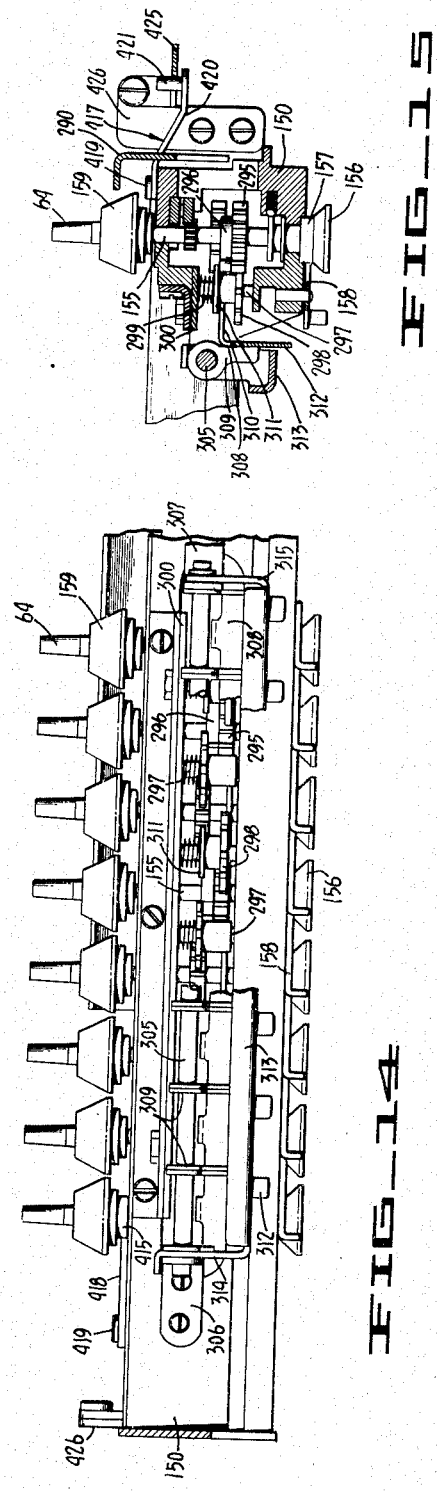

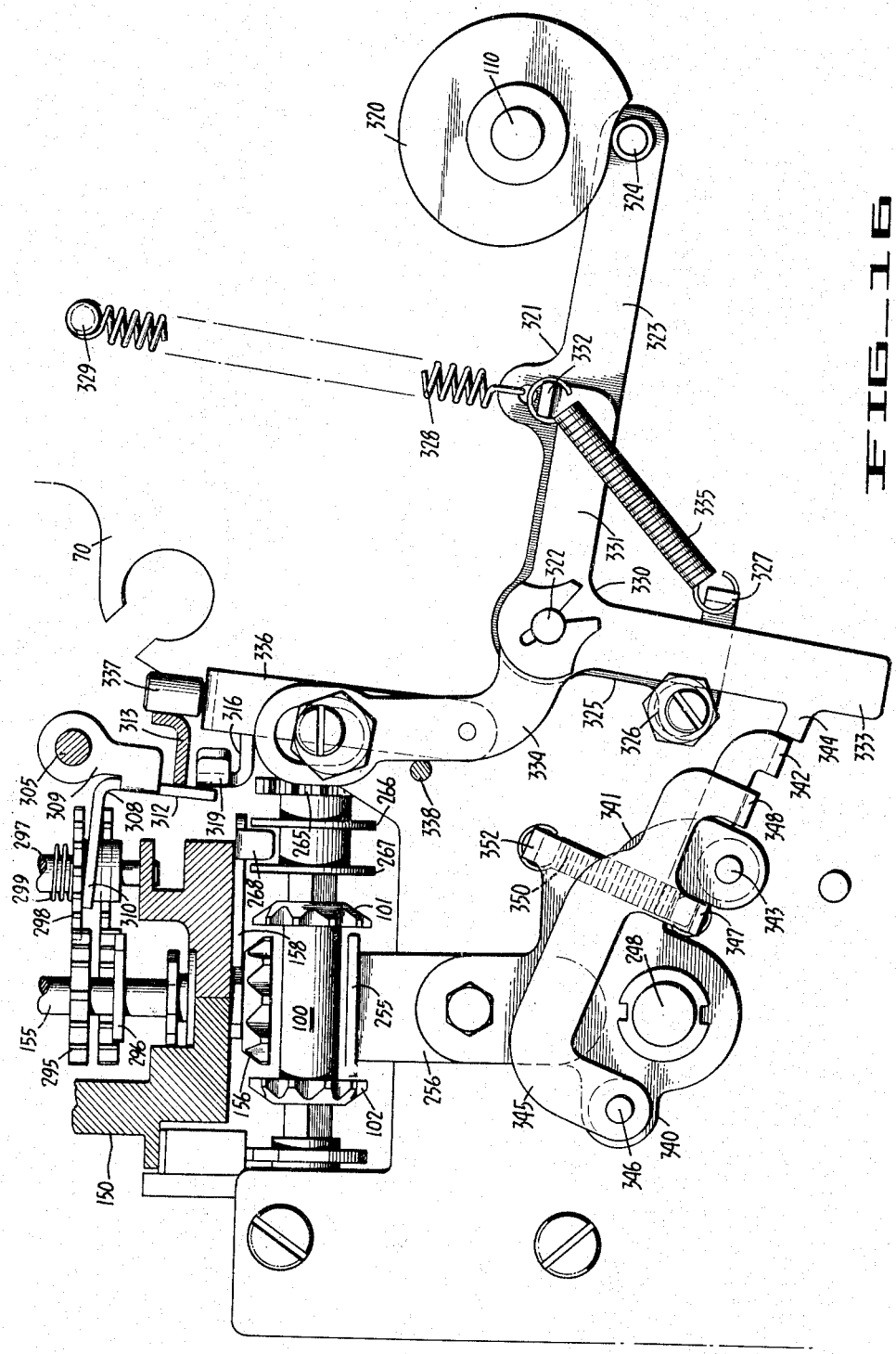

United States Patent Office 3,003,689
Patented Oct. 10, 1961

3,003,689
CALCULATING MACHINE
Grant C. Ellerbeck, San Leandro, Calif., assignor to Friden, Inc., a corporation of California
Filed Jan. 8, 1957, Ser. No. 632,997
7 Claims. (Cl. 235—63)

This invention relates to calculating machines having automatic division programming mechanism and more particularly to an improved dividend and divisor aligning mechanism for such a machine, and in effect is an improvement over the aligning mechanism disclosed in my patent, No. 2,919,852 issued January 5, 1960.

It is among the objects of the invention to provide, in a calculating machine having plural order dividend and divisor receiving mechanisms transordinally movable relative to each other, means effective upon initiation of division operation of the machine, to sense the ordinal position of the dividend relative to the divisor and shift the dividend to a right-hand terminal or predetermined position relative to the divisor, if the dividend initially extended to the left of the highest order of the divisor.

It is a further object of the present invention to provide in a calculating machine having a plural order dividend storing component and a plural order divisor storing component and division programming mechanism, means for shifting one plural order component relative to the other plural order component, one ordinal step for each machine cycle, in a direction to bring the higher orders of the shifting component into registry with the highest order of the other component, before the beginning of the division programming operation, the division programming mechanism being effective to shift the one component in the other direction relative to the other component one ordinal step for each three machine cycles during the division programming operation.

It is also an object of the invention to provide in a calculating machine of the character indicated, means for sensing the ordinal position of a dividend relative to a divisor in not more than two operating cycles of the machine and for starting division operation immediately if the dividend is sensed to be in alignment with, or to the right of the divisor.

It is a further object of the invention to provide a dividend and divisor aligning mechanism which is simple in construction, rapid and positive in operation, and which can be applied to an existing calculating machine with no material change in the construction of the machine.

Other objects and advantages will become apparent from a consideration of the following description and the appended claims in conjunction with the accompanying drawings wherein:

FIG. 1 is a top plan view of a calculating machine incorporating division aligning mechanism exemplifying the invention;

FIG. 2 is a fragmentary, longitudinal cross-sectional view near the right-hand side of the machine;

FIG. 3 is a fragmentary, longitudinal cross-sectional view substantially on a plane indicated by the line 3—3 of FIG. 1;

FIG. 4 is a fragmentary rear elevational view of the machine;

FIG. 5 is a fragmentary cross-sectional view substantially on a plane indicated by the line 5—5 of FIG. 3 with the register carriage of the machine omitted;

FIG. 6 is a longitudinal cross-sectional view of elements disposed to the right of the structure shown in FIG. 2 and looking from the left-hand side thereof;

FIG. 7 is a side elevational view of the right-hand side of the machine with the machine cover removed;

FIG. 8 is a fragmentary elevational view of the right-hand end of the machine with some of the parts shown in FIG. 7 omitted to better illustrate other parts;

FIG. 9 is a view similar to FIG. 8 with the parts in a different operative position from that shown in FIG. 8;

FIG. 10 is a perspective view of the division aligning mechanism shown in FIG. 7;

FIG. 11 is a fragmentary cross-sectional view substantially on a plane indicated by the line 11—11 of FIG. 1;

FIG. 12 is a fragmentary cross-sectional view substantially on a plane indicated by the line 12—12 of FIG. 11;

FIG. 13 is a top plan view of the left-hand end portion of the machine register carriage with certain of the parts broken away to illustrate the construction of an extended tens-transfer mechanism mounted on the carriage;

FIG. 14 is a longitudinal cross-sectional view substantially on a plane indicated by the line 14—14 of FIG. 13;

FIG. 15 is a transverse cross-sectional view substantially on a plane indicated by the line 15—15 of FIG. 13; and, FIG. 16 is a fragmentary, longitudinal cross-sectional view on an enlarged scale taken substantially on a plane indicated by the line 16—16 of FIG. 1.

With continued reference to the drawings, there is illustrated a well-known form of automatic calculating machine having therein special mechanism, brought into operation by depression of the division key of the machine, to sense the ordinal position of a dividend relative to a divisor in the machine so that the dividend and divisor may be promptly brought into proper alignment for the division operation. Since the machine is, in general, well-known and fully illustrated and described in prior patents, the following description will detail only those portions of the calculating machine that cooperate directly with the improved division alignment mechanism of the present invention.

Selection

Referring to FIG. 1, it will be observed that the machine has a full keyboard including a plurality of digit keys 20 arranged in ten ordinal rows with keys numbered from "1" to "9" in each row. An ordinal "0," or clear, key 21 is disposed at the front end of each row of digit keys 20, each such key being effective, when depressed, to release a depressed digit key in the same order, or, if raised, to lock such a depressed key in the depressed condition. The full keyboard keys 20 are used for entering amounts either additively or subtractively into the main, or accumulative, register of the machine, for entering a dividend in the accumulative, or dividend, register, and for setting up a divisor to be divided into the dividend set up in the dividend register. It is to be understood, however, that a dividend may be entered or set up in the dividend register by other means, as by manually turning the dividend register dials, or as the product of a previous multiplication operation. In some machines the dividend may also be entered in the dividend register by transfer from another register or a constant factor storage mechanism.

The machine is also provided with an auxiliary keyboard for use in multiplication. The auxiliary keyboard has ten digit keys 22 and a "0" key 23 for entering amounts in a multiplier storage mechanism of well-known construction.

A number of control keys are also provided and include an addition key 25, a subtraction key 26, a carriage right shift control key 27, a carriage left shift control key 28, a division control key 29, a quotient register sign reversing control key 30 disposed alongside the division key 29, a keyboard clearing key 31 and a register return and clear key 32. A group of manually operated control levers is positioned immediately above the described group of control keys and includes a keyboard locking lever 35, a division stopping lever 36 and an "add" lever, or key, 37, which, when in operative position, causes the machine to clear the keyboard and come to a stop at the end of each machine operating cycle. There is also a dividend tabulating key 38, which is effective, in combination with a series of tabulating buttons 40 carried by the register carriage of the machine, to cause a dividend set up in the keyboard to be entered into the dividend register at a selected ordinal position as predetermined by the selection of the "tab" buttons 40.

A plurality of multiplication control keys are grouped around the auxiliary keyboard of the machine and include a multiplier clearing key 41, a multiplication key 42, an accumulate multiplication key 43 and a negative accumulate multiplication key 44. Control keys, or levers, are disposed rearwardly of the auxiliary keyboard and include a multiplication repeat key 45, a multiplier nonentry key 46 and a counter register direction control key 47.

All of the above-mentioned keys have stems extending through suitable apertures in the top portion 50 of the machine cover. The top portion 50 also has a window 51 through which the check dials 52 of the multiplier storage mechanism are visible. Side panels 53 and 54 cover the left-hand side and right-hand side of the machine at the corresponding edges of the front cover portion 50, and the top portion is extended downwardly to provide a cover for the front end of the machine.

A shiftable carriage 60 is slidably mounted on the machine rearwardly of the full keyboard and carries the accumulator, or dividend register, 61 and the counter, or quotient register, 62, as well as the tabulation buttons 40. The carriage is provided with a cover 63 having window openings therein through which the register dials may be viewed and through which the tabulation buttons 40, and the twirler knobs 64 for the accumulator register dials, project. A pair of knobs 65 and 66 is disposed above the cover 63 at the right-hand end of the carriage and have stems extended through corresponding slots in the carriage cover and connected to the register clearing mechanism for operating such mechanism to manually clear the registers 61 and 62.

The frame of the machine (FIG. 5) includes a base plate, not illustrated, a left-hand side plate 70, a right-hand side plate 71 and an outboard, or control, plate 77 disposed to the right of the right-hand plate 71. The plate 70 is shown in FIG. 3, the plate 71 in FIG. 2. the plate 77 in FIG. 6, and the relative position of these plates is shown in FIG. 5. The plate 70 may be provided in two or more pieces and there are also one or more intermediate plates, or brackets, not shown in FIG. 5. As shown in FIG. 3, a plurality of cross-members 72, 73, 74, 75, and 76 are disposed between the side plates 70 and 71 in spaced-apart and parallel relationship to each other and are supported, either directly or indirectly, by the side plates.

The main, or full, keyboard of the machine has a frame 80 (FIG. 3) supported at its rear end on the top edge of the cross-member 72 and provided with openings through which the stems 81 of the keys 20 extend. The keys are supported for sliding movement relative to the frame 80 by pairs of upper and lower rods 82 and 83 which extend transversely of the frame and through slots provided, one in each key stem. The keys are resiliently urged to their raised position by individual springs 84 and are releasably latched in depressed position by ordinal latching bars 85, engageable in notches 86 in the key stems. A pair of selection slides, or V-bars, 87 and 88 is disposed below each row of keys 20 and supported on pivoted struts, one of which is shown in FIG. 3, and designated 89. Each of the bars 87 and 88 is provided in its upper edge with a series of notches 90. These notches have differentially inclined cam edges and each of the key stems 81 carries a pin 91 which cooperates with the corresponding cam edges when the key is depressed to move the associated selection slide forwardly a differential amount. The notches are so arranged that the slide 87 of each pair is moved by the "1" to "5" keys of the corresponding row, while the slide 88 is moved by the "6" to "9" keys of the same row.

A plurality of square shafts 95 extend rearwardly from the cross-member 72 in ordinal arrangement with the keyboard and in spaced-apart and parallel relationship to each other. Each of these square shafts is journalled at its front end in the cross-member 72, at its rear end in the rear cross-member 76, and intermediate its length in the cross-member 74. Selection gears 96 and 97 are slidably mounted in tandem relationship on each square shaft, and these gears, when driven, are effective to drive the corresponding square shafts. These gears are slidable along the corresponding square shafts, but are drivingly connected to the square shafts by reason of the square shafts extending through square apertures in the gears. The selection slides are extended rearwardly of the cross-member 72, the slide 87 being provided at its rear end with a yoke 98 which engages in a hub groove in the gear 96, and the slide 88 being provided with a similar yoke 99 which engages in a hub groove in the gear 97. With this arrangement the gear 96 or the gear 97 will be differentially set along the corresponding square shaft 95 in accordance with the number of the digit key 20 depressed in the same order as the square shaft.

Between the cross-members 75 and 76, each square shaft carries a register dial driving spool 100 which is slidable on, and rotatable with, the square shaft. The spools 100 are frequently referred to as "plus-minus" spools and each comprises an intermediate sleeve portion of cylindrical shape and plus and minus beveled gears 101 and 102 disposed respectively at the front and rear ends of the intermediate portion.

*Actuation*

A plurality of actuator shafts 105 extends between the cross-members 72 and 75 below, and parallel to, the square shafts 95. Each actuator shaft is journalled at its front end in the plate 72, at its rear end in the plate 75, and carries two stepped sector drums 106 and 107. Each actuator shaft is disposed between two adjacent square shafts, and one of the drums on each actuator shaft operates the selection gears on the square shaft to the right of that actuator shaft, while the other drum operates the selection gears on the square shaft to the left of the particular actuator shaft. Each of the stepped-drums 106 and 107 comprises a series of toothed sectors having from one to nine teeth, and the gears 96 and 97 are so arranged that when a digit key 20 is depressed the corresponding gear will be brought into alignment with the toothed sector having the number of teeth corresponding to the number of the depressed key. When the machine cycles, the square shaft will then be given a partial rotation comprising a number of rotational increments corresponding to the number of the depressed keyboard key.

A main power shaft 110 extends transversely of the machine at the front side of the cross-member 72 and is journalled on this cross-member. Each of the actuator shafts 105 carries, at the rearward side of the plate 72, a miter gear 111, and the shaft 110 carries a series of miter gears 112 meshing with corresponding miter gears 111 to drive the actuator shafts when the main shaft 110 is driven.

Referring to FIG. 2, a clutch disk 113 is secured on the right-hand end of shaft 110 at the outer side of the right-hand side plate 71. A gear 114 (FIG. 5) is journalled on the shaft 110 at the outer, or right-hand, side of the clutch disk 113, and this gear carries a ratchet wheel 115 which is journalled on the shaft 110 between the gear and the clutch disk 113. A clutch pawl 116 is pivotally mounted at one end on the clutch disk 113 and has, intermediate its length, a tooth formation 117 engageable with the teeth of the ratchet wheel 115 for drivingly connecting the gear 114 to the shaft 110. A spring 118, connected to the free end of the pawl 116, urges the pawl to move in a direction to bring its tooth 117 into engagement with the teeth of the ratchet wheel 115. A clutch control arm 120 is pivotally mounted on the side plate 71 by a pivotal support 121 and has its lower end positioned to engage a shoulder 122 on the clutch pawl 116 near the free end of the clutch pawl. When the lower end of the control lever 120 is in engagement with the shoulder 122, the clutch pawl is held away from the ratchet wheel 115 so that the gear 114 can rotate freely on the shaft 110. When, however, the control arm 120 is rocked in a clockwise direction, as viewed in FIG. 2, the clutch pawl 116 is released and moved by the spring 118 to drivingly connect the gear 114 to the main power shaft 110. A motor shaft 123 extends through the side plate 71 and carries a drive gear 124. One or more idler gears 125 is drivingly interposed between the gear 124 and the gear 114 to provide a speed reducing drive between the motor shaft and the power shaft 110.

The motor circuit is controlled by a suitable switch, not illustrated, and this switch is operated by a slidable link 130. A lever 131 is pivotally mounted intermediate its length on the frame side plate 71 and is pivotally connected at its lower end to the front end of the link 130. A link 132 connects the upper end of the lever 131 to the upper end of the clutch control arm 120 so that when the lever 131 is rocked clockwise, as viewed in FIG. 2, the clutch control arm 120 is rocked to cause the clutch to engage and the link 130 is moved forwardly to close the motor switch. A roller 133 is mounted on the control arm 120 between the pivot 121 and the lower end of this arm and the clutch disk 113 has a single low portion which receives this roller when the disk is in the full-cycle position of the machine. When the roller 133 is out of the low portion in the cam, the link 130 is maintained in position to keep the motor switch closed so that the motor cannot stop when the machine is out of its full-cycle position.

A cam arm 134 is pivoted on the pivotal mounting of the lever 131 and connected to this lever. The right shift key 27 has a roller stud 135 which engages the cam arm 134 to rock this arm and the arm 131 in a clockwise direction, as viewed in FIG. 2, when the key 27 is depressed. The left shift key 28 carries a similar roller stud 136 engaging the cam arm 134 when the key 28 is depressed, so that the clutch will be engaged and the motor switch closed whenever the right shift key or the left shift key is depressed.

As shown in FIG. 6, a motor control slide 137 is slidably mounted on the inner, or left-hand, side of the control plate 77 by screws 138 and 139 which extend through slots in the control slide and through slots in the add and subtract key stems 140 and 141 to the control plate. The slide is provided in its upper edge with diagonal notches inclined in the same direction. The key stems 140 and 141 carry pins 142 and 143 which engage in the inclined notches in the control slide to move the slide rearwardly whenever the addition key 25 or the subtraction key 26 is depressed. A pin 144 projects to the left from the forward portion of the slide 137 and is engaged in a notch in the lower edge of a link 145 (FIG. 2), pivotally secured at its rearward end to the upper end of the lever 131, so that the lever 131 is rocked to engage the cyclic clutch and close the motor switch whenever the addition key or the subtraction key is depressed.

Accumulation mechanism

As shown in FIG. 3, the carriage 60 comprises a tubular frame member 150 of substantially rectangular cross-sectional shape, and a front rail 151 of channel-shaped cross-section held in spaced and parallel relationship to the front side of the member 150. At its rear side, the member 150 is slidably supported on the upper edge of a fixed rail 152 carried by the rear cross-member 76 of the machine frame. The front rail 151 is supported on rollers 153 carried by the frame cross-member 73. The accumulative, or dividend, register 61 comprises a series of dial assemblies extending through the carriage frame member 150 at uniformly spaced-apart locations along this frame member. In the arrangement illustrated in FIG. 1, there are ten orders of keys in the full keyboard, and there are twenty dial assemblies in the accumulative register. When the carriage is in its terminal left-hand position, as shown in FIG. 1, the first eleven orders of the accumulative register will be serviced by the tens-transfer mechanisms operated directly by the actuating mechanism of the machine. The nine upper orders of this register, that is the twelfth to twentieth orders, will be outboard of the primary tens-transfer mechanism and, in order to complete tens-carries to the highest order of the register, require an extended tens-transfer mechanism, as will be later described.

Each of the dial assemblies of the accumulative, or dividend, register comprises a shaft 155 disposed in substantially upright position and extending through, and journalled in, the frame member 150. Each shaft 155 carries on its lower end, below the bottom surface of the frame member 150, a beveled gear 156 engageable by the spool gears 101 and 102 of the corresponding order to rotate the dial assembly in one direction or the other, depending on which of the gears 101 or 102 is in engagement with the gear 156. A single lobe tens-transfer cam 157 is mounted on the shaft 155 between the gear 156 and the bottom surface of the frame member 150. This cam cooperates with a pivoted tens-transfer lever 158, to be referred to later in connection with the description of the tens-transfer mechanism. A numbered dial 159 is mounted on the upper end of the shaft 155 immediately above the top surface of the frame member 150 and the twirler knob 64 projects upwardly from the upper end of the dial. A mutilated clearing gear 160 is mounted on the shaft 155 within the interior of the hollow frame member 150. A clearing rack 161 is slidably mounted in a recess extending longitudinally of the upper portion of the interior of the frame member 150 and engages the gears 160 to turn the dial assemblies to their "0" position when the rack 161 is moved to the right relative to the carriage.

The counter, or quotient register, comprises a series of dial assemblies uniformly spaced-apart along the carriage frame member 150 and extending between this frame member and the front rail 151, with their rotational axes substantially perpendicular to the rotational axes of coordinal dial assemblies of the accumulative, or dividend, register. Each of the counter register dial assemblies comprises a shaft 165 journalled at its rear end in the front portion of the frame member 150 and journalled at its front end in the front rail 151 of the carriage frame. In each of the counter register dial assemblies, a numbered dial 166 of cylindrical shape is mounted on the dial shaft 165. An operating gear 167 is mounted on the shaft at the front side of the dial 166 and a flange 168 is supported in a position forwardly of the gear 167 by an intervening gear hub, or sleeve. The flange 168 is provided with a single notch which cooperates with the counter register actuator 170 for effecting a tens-transfer from lower orders to higher orders of the register. A mutilated clearing gear 171 is mounted on each shaft 165 between the corresponding dial 166 and the carriage frame member 150. A clearing rack 172 engages these gears when the rack is moved to the right relative to the carriage, to return the dial 166 to "0" position. The rack 172 is supported on guide rollers 173 mounted on the front side of the frame member 150.

The counter actuator comprises a shaft 175 which extends in spaced and parallel relationship to the front side of the carriage frame member 150 and substantially immediately below the carriage front rail 151. This shaft is rocked and reciprocated during operation of the machine by mechanism well-known to the art. A series of sleeves 176 is mounted on the shaft 175 in end-to-end relationship. Each sleeve has a length of approximately one order of the counter register and has fingers, as indicated at 177 and 178, projecting upwardly, respectively at the right and left end of the sleeves. Brackets are secured to the shaft 175, one at each end of the actuator 170, and a rod 179 extends between these brackets and is held by them in spaced and parallel relationship to the shaft 175. Each of the fingers 178 is connected to the rod 179 by a corresponding tension spring 180 so that the fingers 177 and 178 are resiliently urged to rock with the shaft 175. The fingers always reciprocate with the shaft but, since the finger 177 is disposed at the side of the flange 168, remote from the corresponding gear 167, it will restrain the associated finger 178 from engaging the gear 167 except when the single notch in the flange 168 is in alignment with the finger 177. The arrangement is such that when a finger 177 passes through a notch in the associated flange 168, the finger 178 on the same sleeve can engage the actuating gear 167 of the next higher order and impart a unit rotation to the dial 166 of such higher order. The notch in the flange 168 will be in alignment with the associated finger 177 only when the coordinal dial 166 moves through its "9" to "0" position additively or subtractively, and a tens-transfer to the next higher order is appropriate. The orders of the actuator 170 will operate the coordinal dial assemblies of the counter register, regardless of the ordinal position of the carriage relative to the counter actuator.

The carriage is shifted to the right or to the left relative to the stationary portion of the machine by mechanism particularly illustrated in FIGS. 4 and 5. The carriage shifting mechanism derives its power from rearward elongations of the two right-hand actuator shafts 105. The rearward elongations of these shafts are indicated at 105a and 105b in FIG. 5. The shaft extension 105a carries, on its rear end, a rockable clutch element 182, and the shaft extension 105b carries, on its rear end, a similar rockable clutch element 183. A gear 184 (FIG. 3) is disposed at the rear side of the rear cross plate 76 of the machine frame and is journalled at one end in the cross-member 76 and at its other end in a bracket plate 185 supported rearwardly of the cross-member 76 in parallel relationship thereto. A clutch plate 186 is disposed at the front side of the cross-member 76 and concentrically secured to the gear 184. This clutch plate is provided with an aperture in which a tongue 187 on the rockable clutch element 182 engages when the clutch element is rocked to operative position. A second gear 188 is disposed between the cross-member 76 and the bracket plate 185 and is journalled in these members. A clutch plate 189, disposed at the front side of the member 76, is concentrically secured to the gear 188 and is provided with an aperture in which a tongue 190 on the clutch element 183 engages when this clutch element is rocked to operative position. With this arrangement, either the gear 184 or the gear 188 will be turned when the corresponding clutch element 182 or 183 is rocked to operative position. Means, not illustrated, are provided to preclude both of the clutch elements moving to operative position at the same time.

The gear 188 meshes directly with the larger gear 191 of a compound gear journalled on an axle 192 disposed between the gears 184 and 188. The smaller gear 193 of the compound gear meshes with a larger gear 194 mounted on an axle 195 disposed directly above the axle 192. The gear 184 meshes with a reversing gear 196, which, in turn, meshes with the larger gear 191 of the compound gear so that the gears 188 and 184 will turn the compound gear and, consequently, the gear 194 in respectively opposite directions. A disk 197 is rigidly mounted on the axle 195 at the rear side of the gear 194, so that the gear 194 and the disk 197 rotate together. The disk carries four pins 198 which project forwardly from the front side of the disk and are arranged at 90° angular intervals around the disk and uniformly spaced from the axle 195. A rack 200 is adjustably mounted on the rear side of the carriage frame member 150, which rack is provided in its lower edge with spaced-apart notches 201 in which the pins 198 engage to shift the carriage when the disk 197 is rotated. The ratio of the several gears driving the disk 197 is such that the disk is turned through an angle of approximately 90° for each complete cycle of the calculating machine. This will move one of the pins 198 into engagement in a corresponding notch 201 in the shift rack 200, will move the shift rack and the carriage one ordinal space in the selected direction and will leave the pin sufficiently engaged in the notch to preclude accidental shifting movement of the carriage. Right-hand and left-hand override pawls 202 and 203 are pivotally mounted on the carriage frame at the respectively opposite ends of the shift rack 200. These pawls are resiliently held in position to be engaged by the pins 198 by springs 204 and 205 but are rockable against the force of these springs so that the disk 197 can continue to turn after the carriage has reached its terminal position in either direction. Rocking of the override pawls by the pins 198 is used to condition the mechanism for returning the carriage in the opposite direction from a terminal position.

The disk 197 is locked at any position of the carriage by means of a pair of bellcrank levers 206 and 207 which are pivotally mounted at their angles on the rear cross-member 76 and extend upwardly from their pivotal mountings into engagement with radially projecting lugs on the periphery of the disk 197. These levers are urged into locking position by a spring 208 connected between the levers, and are moved away from each other to release the disk by a rocking lever 209 actuated by a cam 210. The cam 210 is mounted on a rearward extension 105c of the third actuator shaft 105 from the right-hand side of the actuating mechanism. The relationship between this cam and the clutch elements 182 and 183 is such that the cam acts to release the disk from the locking levers 206 and 207 before either of the clutches can engage to turn the disk 197.

The tiltable clutch elements 182 and 183 are controlled by actuating yokes 211 and 212, respectively, mounted on the rear ends of corresponding push rods 213 and 214. The push rods 213 and 214 extend through the transverse frame member 72 and are urged forwardly by compression springs 220 and 221 acting between collars fixed on the push rods and the front side of the cross-member 72.

The above-described carriage shift mechanism is fully shown in Patent No. 2,636,678, patented April 28, 1953 by Morton P. Matthew, to which patent reference may be had for a more complete illustration and description of the mechanism.

A shaft 222 is supported by the machine frame forwardly of, and in spaced relationship to, the transverse frame member 72, and a cam arm 223 projects upwardly from the right-hand end of this shaft. The cam arm 223 is engaged by a pin, not illustrated, on the stem of the left shift key 28 to rock the shaft 222 when this key is depressed.

An arm 224 is secured to the shaft 222 adjacent the front end of the left shift clutch control rod 214 and extends downwardly from the shaft. A pusher link 225 is pivotally connected at its forward end to the lower end of the arm 224 and extends rearwardly into engagement with the front end of the rod 214 to force this rod rearwardly and engage the left shift clutch when the shaft 222 is rocked. A sleeve 226 is rotatably mounted on the shaft 222 to the left of the arm 224 and carries downwardly projecting arms 227 and 228, one at each end of the sleeve. The right-hand arm 227 is spaced from the arm 224 by a spacer sleeve 229 surrounding the sleeve.

A pin 230 projects to the right from the lower end of the arm 227 into opposition to the front end of the control rod 214. The sleeve 226 and the arms 227 and 228 are part of a light key touch mechanism, not illustrated in the accompanying drawings but fully disclosed in Patent No. 2,650,761, patented September 1, 1953 by Anthony B. Machado.

A sleeve 231 rotatably mounted on the shaft 222 between a position adjacent the front end of the right shift clutch control rod 213 and the cam arm 223. A cam arm 232 projects upwardly from the right-hand end of the sleeve 231 and is engaged by a pin, not illustrated, on the stem of the right shift key 27 to rock the sleeve 231 when this key is depressed. A lever arm 233 is secured to the left-hand end of the sleeve 231 and extends downwardly from the sleeve. A pusher link 234 is pivotally connected at its front end to the lower end of the arm 233 and engages, at its rear end, the front end of the control rod 213, so that this control rod will be moved rearwardly to engage the right shift clutch when the right shift key 27 is depressed.

The above-described mechanism is effective to shift the carriage in either direction upon actuation of the corresponding manual shift key 27 or 28.

An override slide 235 (FIG. 4) is slidably mounted on the rear side of the rear transverse member 76 at the right-hand end of this member. The slide is forced downwardly by the right-hand override pawl 202 during the cycle following the cycle in which the carriage is moved to its terminal left-hand position. Suitable link and lever mechanism, not illustrated herein, but such as that shown in Patent No. 2,634,053, patented April 7, 1953, by Grant C. Ellerbeck, is interposed between the override slide 235 and the left shift pusher link 225 to raise this link out of engagement with the left shift control rod 214 when the override slide is moved downwardly during the first cycle after the carriage has reached its terminal left-hand position to terminate operation of the carriage shifting mechanism.

When the left-hand override pawl 203 is rocked during the cycle following a cycle in which the carriage is moved to its terminal right-hand position, the override pawl engages a pin 236 carried by a lever 237 and rocks this lever about its pivotal mounting 238. The lever 237 carries a pin 239 which engages one arm 240 of a three-armed lever 241 and rocks the lever 241 about its pivotal mounting 242. A second arm 243 of the lever 241 has a terminal formation 244 which engages under a pin 245 carried at the rear end of a lever 246. As shown in FIG. 3, the lever 246 is pivotally mounted intermediate its length on an add-subtract gate shaft 248 of the machine and is rocked in a counter-clockwise direction when the lever 241 is rocked by the lever 237. At its front end, the lever 246 is connected to the rear end of a lever 249 by a pin 250 extending from the lever 246 through a slot in the lever 249. The lever 249 is pivoted intermediate its length on a pivotal mounting 251 carried by a bracket 252 mounted on the transverse frame member 72. The lever extends forwardly of this frame member so that its front end underlies the lower edge of the pusher link 234. The lever is provided at its front end with an angularly offset ear 253 and the pusher link has a lower, rearwardly directed finger formation 254 resting on the ear 253. With this arrangement, when the carriage has been moved to its terminal right-hand position, the pusher link 234 is rocked upwardly to release the control rod 213 and thereby disable the right shift clutch of the machine.

Add-subtract control mechanism

An add-subtract gate (FIG. 3) is mounted on the rockable gate shaft 248 and comprises a transversely extending, flat strap portion 255 disposed immediately below the intermediate portions and between the terminal gear formations of all of the add-subtract spools 100. The strap portion 255 is mounted on the shaft 248 by legs, one of which is indicated at 256 in FIG. 16. These legs extend downwardly from the respectively opposite ends of the strap portion and are secured at their lower ends to the shaft 248. When the add-subtract gate is rocked, it will move the spools 100 either forwardly or backwardly to bring the terminal gear formations 101 or 102 into mesh with the coordinal dial turning gears 156.

When the gate is rocked forwardly, the subtract gears 102 will be brought into mesh with the dial shaft gears 156; and when the gate is rocked rearwardly, the add gears 101 will be brought into mesh with the dial gears. When the gate is in its centered, or neutral, position, both gears 101 and 102 will be clear of the corresponding gears 156 and the carriage can then be shifted longitudinally without interference between the dial driving gears.

Referring to FIG. 6, an add-subtract slide 257 is slidably mounted on the control plate 77 at the inner, or left-hand, side of the this plate, and has inclined cam edges 258 and 259 which are engaged by studs 260 and 261 carried by the stems of the addition key 25 and subtraction key 26, respectively. The cam edges are oppositely inclined and so arranged that when the addition key 25 is depressed, the slide 257 is moved rearwardly; and when the subtraction key 26 is depressed, the slide 257 is moved forwardly. Near its rear end and rearwardly of the control plate 77, the slide 257 is pivotally connected by a pin 262 to the upper end of an arm 263 (FIG. 5) which is secured at its lower end to the right-hand end of the add-subtract gate shaft 248 and extends upwardly from this shaft. Thus, by rocking the add-subtract gate, the selection and actuation mechanism of the machine can be selectively connected to the accumulator register for additive or subtractive operation.

Tens-transfer mechanism

A tens-transfer gear 265 (FIG. 3) is slidably mounted on each of the square shafts 95 rearwardly of the transverse frame member 74 and each of these gears is rotatable with, and effective to drive, the corresponding square shaft. Each gear 265 has a rearwardly extending hub carrying two spaced-apart, annular flanges 266 and 267. Each of the tens-transfer levers 158 is provided at its front end with a downwardly extending lug 268 which extends between the flanges of the transfer gear of the order next above the tens-transfer cam 157 which engages the opposite end of the tens-transfer lever. With this arrangement, when a dial is turned through its "9" to "0" position, its tens-transfer cam 157 will rock the associated tens-transfer lever 158 and the lever will move the tens-transfer gear 265 of the next higher order forwardly. Detenting pins 270 are disposed, one below each square shaft 95, and are slidably mounted in the frame cross-member 75 and in a crossbar 271 disposed rearwardly of, and parallel to, the member 75. Each transfer pin carries a pair of spaced-apart annular flanges 272 and the rear flange 267 of the coordinal tens-transfer gear extends between the flanges 272 so that the pin 270 moves with the coordinal tens-transfer gear. Each pin 270 is resiliently detented in either position of the associated gear to hold the gear either in its retracted, or inoperative, position or in its extended, or operative position until the tens-transfer has been completed. Each actuator shaft carries a pair of radially projecting tens-transfer teeth, as indicated at 273, which are so positioned that when an associated tens-transfer gear is projected, the appropriate tooth will engage the gear and rotate it through one unit space of rotation, thereby turning the associated square shaft 95 and coordinal register dial assembly to add a unit to, or subtract a unit from, the register dial. Each actuator shaft 105 also carries a spirally-shaped restore cam 274, which cams engage the front ends of any projected detenting pins 270 and restore the pins and the associated tens-transfer gears 265 to their retracted, or inoperative, position after the tens-transfer has been accomplished.

This tens-transfer mechanism will accomplish the tens-transfers for all of the register orders which are in registry with the square shafts 95 and add subtract spools 100 of the actuating mechanism. However, in order to carry the ten-transfers to the higher orders of the register dials, which are outboard to the left of the actuating mechanism, an extended tens-transfer mechanism is required and will be later described.

Automatic register clearing

As shown in FIG. 5, the fifth actuator shaft 105 from the right-hand side of the machine is extended rearwardly, as indicated at 105d, and carries a clutch element 275 which is engageable with a clutch disk 276 which drives the automatic register clearing mechanism of the machine. The clutch element 275 is controlled by a control rod 277 carrying a clutch element engaging yoke 278 on its rear end. This rod extends slidably through the cross-member 72 and is resiliently urged forwardly to disengage the automatic clear clutch by a compression spring 279 acting between a collar on the rod and the front side of the cross-member 72. The disk 276 drives a cam 285 disposed at the rear side of the rear cross-member 76. A lever 286, best shown in FIG. 4, is pivoted at its lower end on the rear cross-member 76 at 287 and carries, intermediate its length, a roller 288 which rides on the periphery of the cam 285. The upper end of the lever 286 is engageable with an abutment member 289 secured to a slide 290. The slide 290 is mounted on the upper rear portion of the carriage frame member 150 and is selectively connected to the register clear racks 161 and 172 through means operated by the hand knobs 65 and 66 shown in FIG. 1, such as that described in Patent No. 2,294,083, issued to Carl M. Friden on August 25, 1942.

With this arrangement, when the carriage is moved to its terminal left-hand position and the clutch element 275 engaged with the clutch disk 276 to rotate the cam 285, the registers will be selectively cleared by power operation of the machine. The left shift and automatic clearing operation is established by depression of the dividend tabulating key 38 or the register clear key 32 through mechanism not illustrated herein but similar to that shown in Patent No. 2,403,273, patented July 2, 1946 by C. M. Friden et al.

Extended tens-transfer mechanism

A sixth actuator shaft 105e (FIGS. 5 and 11) is provided at the left-hand side of the actuating mechanism and is driven from the main power shaft 110. This actuator shaft does not carry stepped actuating drums 106 and 107, but, instead, carries a disk 291 positioned between the transverse frame members 72 and 75. A pin 292 projects forwardly from the disk 291 eccentrically of the shaft 105c to function in the control of the division programming mechanism, as will be later described.

The actuator shaft 105e terminates at the rear side of the frame member 75 and carries, between the member 75 and the cross-member 74, a restore cam 274 (FIG. 12) and transfer gear actuating tooth 273.

Two extra square shafts 95a and 95b, particularly illustrated in FIGS. 11 and 12, are disposed above, and at respectively opposite sides of, the supplementary actuator shaft 105e and each of these square shafts carries a tens-transfer gear 265 but neither of them carries any selection gear 96 or 97. The square shafts 95a and 95b also carry add-subtract spools 100 which are in alignment with the eleventh and twelfth orders of the accumulator register when the carriage 60 is in its terminal left-hand position. The transfer gears on the square shafts 95a and 95b are set by the tenth and eleventh orders of the accumulator register when the carriage is in its left-hand position, as stated above, so that transfers will be made to the twelfth order of the register in the same manner that they are carried through the first ten orders. Since the register illustrated has twenty orders, this will leave eight orders of the register outboard of the actuator driven tens-transfer mechanism when the carriage is in its terminal left-hand position. In order to carry tens-transfers through the outboard orders of the register, an extended transfer mechanism is provided, as shown in FIGS. 13, 14, 15 and 16.

The extended tens-transfer mechanism is fully illustrated and described in Patent No. 2,597,507, patented May 20, 1952, by Anthony B. Machado et al., and will be only briefly described herein. Each of the dial shafts 155 of the upper eight orders of the register carries, within the interior of the carriage frame member 150, a spur gear 295 and a single-tooth transfer gear 296. The spur gears on the dial shafts of the odd numbered orders of the upper eight orders are disposed above the spur gears on the shafts of the even numbered orders. The single-toothed gears are disposed below the spur gears on the odd numbered orders while the single-toothed gears of the even numbered orders are disposed above the corresponding spur gears. A series of axles 297 is mounted in the front portion of the carriage frame member 150 and each of these axles is disposed forwardly of, and substantially midway between, two adjacent dial shafts 155, beginning with the axle between the twelfth and thirteenth order dial shafts of the register. A spur gear 298 is slidably and rotatably mounted on each of the axles 297. A spring 299 surrounding each axle 297 between its associated gear 298 and an upper bearing plate 300 resiliently urges the gear 298 downwardly to a position in which it is in mesh with the gear 295 in the order immediately above it and is engageable by the single-toothed gear 296 in the order immediately below it.

With this arrangement, if a lower order dial is turned through its tens-transfer position, i.e., its "9" to its "0" position, the single-toothed transfer gear on its shaft will engage the associated gear 298 and turn the tens-toothed gear 298 through a one-toothed angle. The gear 298 will then turn the associated gear 295 of the next higher order through a one-tooth angle, or unit space, to add a unit to, or subtract a unit from, the dial of such next higher order. If all of the upper eight dials of the register were set at "9" and a tens-transfer were made into the first of these outboard dials from the twelfth order register dial, the transfer would be carried entirely through the upper eight orders to the twentieth order of the register, and likewise, if the upper eight dials were all setting at "0" and a negative transfer were made into the thirteenth order dial, this transfer would likewise be carried through to the twentieth order.

If any one of the gears 298 be raised against the force of the associated spring 299 to a position in which it is out of alignment with the corresponding single-tooth transfer gear 296, the tens-transfer between the two register orders serviced by the particular gear 298 will be disabled. It will be noted that the gears 295 are wider than the gears 298, so that the gears 298 can be moved into, and out of, registry with the corresponding single-toothed gears 296 without becoming disengaged from their corresponding gears 295. This will preclude any rotational misalignment of associated gears 298 and 295 and avoid any errors in making the proper transfers.

Means are provided for individually or collectively moving the gears 298 to inoperative position, and comprise a shaft 305 extending along the front side of the carriage past the upper eight orders of the accumulator register and supported at its ends by angle brackets 306 and 307 secured to the register frame. Eight separate bails 308 are rockably mounted in end-to-end relationship on the shaft 305. Each bail is provided at each end thereof with a perpendicularly offset ear 309 apertured to receive the shaft 305, and with a rearwardly extending tongue 310 which extends under the coordinal gear 298 or under a flange 311 secured to, and spaced above, the coordinal gear. Each bail 308 also has a downwardly extending tab 312, and the arrangement is such that when the tab 312 of any bail is forced inwardly, or rearwardly, the coordinal gear 298 is raised to an inoperative position against the force of the associated spring 299.

A continuous bail 313 extends past all of the individual bail tabs 312 and is rockably mounted on the shaft 305 by terminal ears 314 and 315. This bail is engageable with all of the tabs 312 of the individual bails 308 and is effective, when rocked rearwardly, to disable all of the extended tens-transfer units. It will be noted that the upper eight dial assemblies of the accumulator, or dividend, register are provided with dial driving gears 156 and tens-transfer levers 158 for operation of these dial units when the same are moved inboard of the machine by right-hand shifting of the carriage.

Referring to FIGS. 3 and 16, a fixed rail 316 is mounted by suitable brackets, as indicated at 317, on the transverse frame member 74. The rail is disposed rearwardly of the transverse member 74 in position to engage the tabs 312 of the bails 308 and force these tabs rearwardly as the bails 308 are moved inboard of the normal tens-transfer mechanism of the machine. The rail extends from the left-hand side of the actuating mechanism, or from the twelfth order position when the carriage is in its terminal left-hand position, for a distance of eight orders of the accumulator register, so that all of the orders of the extended tens-transfer mechanism will be disabled when the carriage is in its terminal right-hand position and all of the left-hand orders of the accumulator register are inboard of the machine. The rail 316 is provided at its opposite ends with forwardly inclined ears, or ramps, 318 and 319, which ramps are effective to force the tabs 312 rearwardly as the tabs are moved past either end and particularly as they are moved past the left-hand end of the fixed rail. The fixed rail 316 is thus effective to disable each order of the extended tens-transfer mechanism that is moved inboard of the regular tens-transfer mechanism of the machine and to maintain such extended tens-transfer units disabled until they are again moved outboard of the regular tens-transfer mechanism.

It will be noted that the fixed rail 316 is disposed below the continuous bail 313 so that either of these elements can engage the bail tabs 312 without interference by the other element.

It is desirable to provide means for disabling the extended tens-transfer mechanism when the machine is in full-cycle position so that the accumulative, or product, register can be manually set by means of the twirler knobs 64 on the dial assemblies and so that this register can be manually cleared by operation of the clearing knob 65. It is also desirable that the extended tens-transfer mechanism should be disabled when the add-subtract gate 55 is in its centered, or neutral, position so that the power clearing mechanism can operate to clear the accumulator register without operating the extended tens-transfer mechanism. Suitable mechanism for so disabling the extended tens-transfer mechanism is shown in FIG. 16 to which reference may now be had.

A cam 320 is mounted on the left-hand end of the main power shaft 110 at the left-hand, or outer, side of the left-hand side plate 70. A bellcrank lever 321 is pivotally mounted at its angle on a pivot stud 322 and carries, at the front end of an arm 323 thereof, a roller 324 bearing against the edge of the cam 320. The second arm 325 of this bellcrank lever extends downwardly from the pivot stud 322 and carries, at its lower end, an adjustable abutment device 326 and a spring attaching ear 327 spaced forwardly from the abutment 326. A spring 328, connected between the lever arm 323 and a fixed stud 329, resiliently holds the roller 324 in engagement with the cam 320.

A three-armed lever 330 is pivotally mounted at the juncture of its arms on the pivot stud 322 and has an arm 331 projecting forwardly from the pivot stud 322 along the lever arm 323 and provided at its front end with a spring attaching ear 332. The three-armed lever has a second arm 333 extending downwardly from the pivot stud 322 past the adjustable abutment 326, and has a third arm 334 extending upwardly from the pivot stud. A tension spring 335, connected between the ears 327 and 332, resiliently rotates the lever 330 relative to the lever 321 to hold the rear edge of the lever arm 333 in engagement with the adjustable abutment 326. An extension 336 is adjustably connected to the upper portion of the lever arm 334 and extends upwardly above the upper end of this lever arm. The extension 336 carries a roller 337 which is positioned to bear against the front side of the continuous bail 313. The cam 320 is provided with a single low portion, which, in the full-cycle position of the cam, as shown in FIG. 16, receives the roller 324 and enables the spring 328 to rock the levers 321 and 330 in a counter-clockwise direction, as viewed in FIG. 16. This rocking of the levers by the spring 328 moves the roller 337 rearwardly against the bail 313 and forces the bail rearwardly. Since the bail 313 engages all of the bail tabs 312, this forces the bail tabs rearwardly, raising the bail tongues 310 to raise the connecting gears 298 to their inoperative position. At a time in a machine cycle before a tens-transfer is made from the eleventh to the twelfth order of the main tens-transfer mechanism of the machine, the cam 320 moves the roller 324 downwardly. This rocks the levers 321 and 330 in a clockwise direction, as viewed in FIG. 16, to move the roller 337 forwardly, away from the bail 313 and thereby release the extended tens-transfer mechanism. The connecting gears 298 will then be moved downwardly to operative position by their individual springs 299, so that the extended tens-transfer mechanism will be enabled for the remainder of the machine cycle. Substantially at the end of the cycle, the roller 324 will again drop into the low portion of the cam 320, thereby freeing the spring 328 to again disable the extended tens-transfer mechanism. A stop pin 338 extends outwardly from the side plate 70 in position to be engaged by the rear edge of the lever arm 334 and provide a positive stop for rocking movement of the lever 330 by the spring 328 when this lever has been fully moved to its tens-transfer disabling position.

The left-hand arm, or leg, 256 of the add-subtract gate 255 is provided, near its lower end, with a rearward extension 340 and a forward extension 341. A lever arm 342 is pivotally mounted intermediate its length on the extension 341 by a pivotal mounting 343 and has, at its front end, an offset ear engageable with a rearwardly projecting finger 344 on the lower end of the lever arm 333. A second lever arm 345 is pivotally mounted at its rear end of the rearward extension 340 of the leg 256 by a pivotal mounting 346. This lever arm is provided, at the rearward and forward sides of the pivotal mounting 343, with offset ears 347 and 348 which underlie the bottom edge of the lever arm 342. A spring 350, connected between the ear 347 and a spring attaching ear 352 on the extension 341 above the lever 345, resiliently urges the forward portion of the lever 345 upwardly and resiliently holds the lever 342 in position to engage the finger 344, as shown in FIG. 16.

With the above-described arrangement, whenever the add-subtract gate is in its centered, or neutral, position and the cam 320 rocks the levers 321 and 330 to release the bail 313 and enable the extended tens-transfer mechanism, the lever arm 342 will prevent the lever 330 from rocking and will thus maintain the extended tens-transfer mechanism disabled. Although the lever 321 will be rocked by the cam, the spring 335 will stretch so that the lever 330 can be held stationary by the blocking action of the lever arm 342.

When the gate 255 is moved to its addition or its subtraction position, the front end of the lever 342 will be moved above or below the rearward end of the finger 344, so that the lever 330 will not be blocked. The spring 350 permits the add-subtract gate to move freely even though there may be interference or frictional binding between the lever arm 342 and the finger 344 at the time the gate is moved.

Division programming mechanism

The division key 29 (FIG. 6) has a flat stem 355 slidably mounted for vertical movement on the control plate 77 by suitable means, such as the rivets 356 and 357 extending through corresponding slots in the key stem. The key is resiliently urged to its upper, or raised, position by a tension spring 358 and is provided at its lower end with an upwardly and rearwardly inclined cam edge 359. A division control slide 360 is slidably mounted on the control plate for longitudinal movement by suitable means, such as the rivets 361, 362 and 363 extending through corresponding slots in the slide. A roller stud 364 is carried by the slide 360 and engaged by the cam edge 359 to force the slide rearwardly when the division key 29 is depressed. A spring 369, connected between the slide 360 and a fixed stud, resiliently maintains the roller stud 364 in engagement with the cam edge 359 of the division key stem.

A division actuating lever 365 (FIG. 7) is disposed at the outer, or right-hand, side of the control plate 77 and is pivotally mounted intermediate its length on a fixed pivotal mounting 366. A strong tension spring 367, connected between the forwardly directed arm of the lever 365 and a fixed stud 368, urges the lever 365 to rock in a counter-clockwise direction, as viewed in FIG. 7.

A division trigger arm 370 is also disposed at the outer side of the control plate 77 and forwardly of the lever 365. This trigger arm is supported at its lower end on a fixed pivotal mounting 371. A spring 372, connected between the lower end of the arm 370 and the stud 368, urges the arm 370 to rock in a counter-clockwise direction, as viewed in FIG. 7. Stepped transverse shoulders, or sears, 373 and 374 are provided at the forward side of the arm 370 near the upper end of this arm. A roller 375, mounted on the lever 365 at the forward end of this lever, normally rests on the shoulder 373, so that the trigger arm 370 restrains the lever 365 against being rocked by the spring 367. An extension 376 extends forwardly from the upper end of the arm 370 and terminates in opposition to a roller stud 377 carried by the division control slide 360 and projecting through an opening in the control plate 77. The arrangement is such that when the division control slide 360 is moved rearwardly by depression of the division key 29, the trigger arm 370 will be rocked in a clockwise direction, as viewed in FIG. 7, to release the roller stud 375 from the shoulder 373 and permit the spring 367 to rock the actuating lever 365. The movement of the slide 360 is such, however, that the roller 375 will move only from the shoulder 373 to the shoulder 374, which movement is not sufficient to trip off division. The machine will thus be conditioned to trip off division by depression of the division key, but division will not actually be tripped off until a subsequent event in the operation of the machine, as will be later described in connection with the dividend and divisor aligning mechanism.

A division programming arm 380 (FIG. 6) is disposed at the inner, or left-hand, side of the control plate 77 and rockably mounted at its lower end on a pivotal mounting 381. Near its upper end, this arm is provided with an opening 382 of substantially rectangular shape receiving a division programming cam 383. The cam 383 is eccentrically mounted on a programming shaft 384 which extends transversely of the machine and is rotated in response to overdrafts created by oversubtraction of the divisor from the dividend in the machine.

A division connecting lever 385 is pivotally mounted intermediate its length on the arm 380 by a pivotal mounting 386 carried at the upper end of the arm 380. A link 387 is pivotally connected at its lower end to the front end of the lever 385. A bellcrank 388, pivotally mounted at its angle on a fixed pivot screw 389 located near the forward end of the control plate 77, has a rearwardly directed arm 390 pivotally connected at its rearward end to the upper end of the link 387. A pin 391 extends from the lower end of the link 387 through an opening in the control plate 77 and under the bottom edge of the actuating lever 365. With this arrangement, when the actuating lever 365 is entirely released from the trigger arm 370 and its front arm is rocked down by the spring 367, it will strike the pin 391 and move the link 387 downwardly. When the link 387 is forced downwardly, the lever 385 is rocked in a clockwise direction and the bellcrank lever 390 is rocked in a counter-clockwise direction, as viewed in FIG. 6. The bellcrank lever 388 has an arm 395 extending upwardly from the pivot screw 389 and bearing against the forward side of a stud 396 projecting from the front end portion of the clutch and motor control slide 137. Thus, when the bellcrank lever 390 is rocked, the motor control slide 137 is moved rearwardly to engage the main clutch of the machine and close the motor switch to place or continue the machine in operation.

The rear end portion of the connecting lever 385 is inclined rearwardly and upwardly and provided in its upper end with an upwardly opening notch 397 flanked at its rearward side by an upwardly and rearwardly inclined cam edge 398. A stud 400 extends to the left from the rearward portion of the add-subtract gate control slide 257 and, when the connecting lever 385 is rocked, as indicated above, the cam edge 398 forces the stud 400 into the notch 397 to move the add-subtract gate forwardly to subtract position and lock the gate in this position as long as the cam 383 is in its full-cycle position, as illustrated in FIG. 6. The division programming arm 380 and connecting lever 385 are resiliently urged forwardly by a spring 401 connected between the control plate 77 and the upper portion of the division programming arm 380.

A shaft 402 extends transversely of the machine rearwardly of the connecting lever 385, and an arm 403 projects forwardly from the shaft 402 adjacent the left-hand side of the control plate 77. A stud 404 projects to the left from the connecting lever 385 and, when the connecting lever is rocked, the stud 404 engages the arm 403 and rocks the shaft 402 in a counter-clockwise direction, as viewed in FIG. 6.

Between the fifth actuator shaft 105d and the sixth actuator shaft 105e (FIGS. 5 and 11), an arm 405 is fixedly mounted on, and extends forwardly from, the shaft 402. At this same general location, a division programming flag 406 is mounted on the shaft 384 and is provided with an upwardly extending finger 407 and a downwardly extending flange 408. The flag 406 is mounted on the shaft 384 for free rotational movement relative to the shaft but is held against movement relative to the shaft in a direction longitudinally of the shaft by a collar secured to the shaft at the right-hand end of the flag. A flag setting link 409 is pivotally connected at its rear end to a yoke 410 by a pivotal connection 411 and is provided at its front end with a slot 412 slidably receiving a pin 413 projecting laterally from the front end of the arm 405. The yoke 410 is fixedly mounted on a pin 414 which extends slidably through the frame cross-members 75 and 76 adjacent the twelfth order detenting pin 270, as shown in FIG. 12. As shown in FIG. 13, the twentieth order dial shaft 155 carries a single lobe cam 415 at the top surface of the carriage frame 150 and, when this twentieth order dial is moved through its tens-transfer position, or from "0" to "9" in subtraction or "9" to "0" in addition, the lobe of the cam 415 engages an abutment 416 on a bellcrank lever 417. The bellcrank lever 417 has one arm 418 extending along the left-hand end of the carriage frame 150 and pivotally connected to the frame at its left-hand end by a pivot screw 419. The other arm 420 of the bellcrank lever extends rearwardly from the abutment formation 416 and carries an upwardly projecting stud 421 at its rear end. With this arrangement, when the lobe of the cam 415 is moved past the abutment formation 416 whenever a tens-transfer is carried through the twentieth order dial assembly of the accumulator or dividend register, the bellcrank lever 417 will be rocked about its pivotal mounting 419 to move the stud 421 rearwardly.

A bail 425 is disposed rearwardly of, and substantially parallel to, the carriage frame member 150 and extends from the left-hand end of the carriage to a position to the right of the twelfth order dial assembly of the dividend register. This bail is rockably supported at its ends by brackets 426 and 427 mounted on the carriage frame member 150 and is moved rearwardly when the bellcrank 417 is rocked rearwardly by the cam 415, as described above. As shown in FIGS. 3 and 11, a vertically disposed lever 428 is pivotally mounted intermediate its length on a fixed bracket 429 by a pivotal mounting 430. The bracket 429 is mounted on, and extends rearwardly from, the rear frame cross-member 76 and is located adjacent the twelfth order dial assembly of the dividend register when the carriage is in its terminal left-hand position. The lever 428 bears near its upper end against the rear edge of the bail 425 and bears at its lower end against an abutment member 431 secured on the rear end of the pin 414.

With this arrangement, whenever a tens-transfer is carried through the extended tens-transfer mechanism to the twentieth order of the dividend register, the bail 425 will be moved rearwardly and, through the lever 428, will move the pin 414 forwardly. This will move the overdraft indicating link 409 forwardly and rock the flag 406 to bring the finger 407 of the flag into the path of the pin 292 carried by the disk 291. The pin 414 is so positioned that at the end of the cycle in which the overdraft occurred, this pin will be restored to its retracted, or inoperative, position by the same restore cam 274 which restores the left-hand detenting pin 270. The rearward portion of the pin 414 is preferably of square cross-sectional shape so that it will not rotate in the supporting members 75 and 76. This square portion of the pin is provided with spaced-apart notches 432 engaged by a spring pressed detent 433 to releasably detent the pin in either its retracted or its projected position.

The arrangement is such that when division is tripped off, rocking the division connecting lever 385 and the shaft 402, the lower end of the link 409 is positioned to engage the flange 408 of the flag 406. Then, when an overdraft occurs, moving the pin 414 forwardly, the link 409 is also moved forwardly and rocks the flag 406 to bring the flag finger 407 into the path of the pin 292. Substantially at the end of the cycle in which the overdraft occurred, the pin 292 engages the flag finger 407 and moves the flag 406 and shaft 384 to the right.

A mutilated gear 435 (FIGS. 8 and 9) is mounted on the right-hand end of the shaft 384 at the outer, or right-hand, side of the control plate 77. This gear has three angularly spaced-apart sets of teeth, with each set including three teeth, and is provided with a peripheral notch which receives a pin 436 projecting outwardly from the control plate 77 to lock the gear against rotational movement when the gear is in full-cycle position and in its left-hand, or retracted, position. A gear 437 is mounted on the right-hand end of the main drive shaft 110 and meshes with a similar gear 438 journalled on a stub axle 439 carried by the control plate 77, as particularly shown in FIG. 5. A mutilated gear 440 (FIG. 10) having one set of two teeth, is also journalled on the stub axle 439, the gear 438 being drivingly connected to the gear 440. The gear 440 is spaced outwardly from the control plate 77 so that when the mutilated division programming gear 435 is in its left-hand, or retracted, position, as shown in FIG. 5, it is to the left of, and clear of, the gear 440, which gear is driven through one complete rotation during each operating cycle of the machine. However, when the gear 435 is moved to the right by the flag 406, as explained above, it is moved out of engagement with the fixed pin 436 and into alignment with the gear 440. The gear 440 will then drive the gear 435 and the shaft 384 through one-third of a rotation during each of three successive operating cycles of the machine until the notch in the gear 435 again comes into register with the pin 436. When this occurs, a spring 441 surrounding the shaft 384 between a collar 442 on the shaft and a fixed bracket 443 returns the shaft 384 to the left and moves the gear 435 out of meshing alignment with the gear 440.

The cam 383 being secured on the shaft 384, the gear 435 will impart three successive rotational movements of approximately 120° each to the cam during three successive operating cycles of the machine. In the cycle in which the overdraft occurs and the first of the following cycle (before digitation can begin), the cam will be moved from its full-cycle, or subtract, position, as shown in FIG. 6, through 120° to an add position. In this first succeeding cycle, the divisor will be added back to the dividend to correct the overdraft. The cam will then be moved through a further angular increment of 120° to a position in which the add-subtract gate is brought to its neutral, or shift, position and the left shift mechanism will then be actuated to shift the carriage one order to the left. The cam will then be turned through a further angular increment of approximately 120° back to its subtract position and the subtraction operation will be resumed and continued until another overdraft occurs.

The division actuating lever 365 is returned during the first actual division cycle to its normal position in which the roller 375 is supported on the shoulder 373 of the trigger arm 370. The means for restoring the actuating lever is particularly shown in FIGS. 8 and 9 and will be described in detail hereinafter. Since the actuating lever 365 is restored to its latched position during the first actual division cycle, other means must be provided to maintain the machine in operation during the division procedure. Such means are shown in FIGS. 2 and 6 and comprise a latch hook 450 pivotally mounted on the side plate 71 by a pivot screw 451. This latch member depends from the pivot screw and is provided at its lower end with a hook formation 452 which engages a flattened pin 453 (FIG. 6) projecting from the connecting lever 385 near the rear end of this lever. When the connecting lever 385 is rocked to operative position to seat the stud 400 in the notch 397, the hook formation 452 engages with the flattened stud 453 and holds the connecting lever in this position until the latch member 450 is moved to release the connecting lever. As long as the connecting lever is held in its rocked position, the main clutch and motor control slide 137 is held in its rearward position by the bellcrank lever 388 and the machine is thus maintained in operation. The latch lever 450 has a tail portion 454 extending upwardly from the pivot screw 451 and the machine carriage is provided at the underside of its right-hand end with a pivoted dog, not illustrated, which engages the tail portion 454 of the latch 450 when the carriage has reached its terminal left-hand position and holds the latch lever in the position which it occupies when the connecting lever 385 is in its subtract position. When an overdraft occurs after the carriage has been moved to its terminal left-hand position and the cam 383 turns to move the connecting lever 385 to an addition position of the add-subtract gate, the dog on the carriage rocks behind the upper end of latch 450. Then, when the cam 383 rotates to its shift position and the connecting lever 385 moved forwardly to its neutral, or shift, position, the stud 453 will be pulled off of the hook formation 452 and the lever 385 will then be released, terminating operation of the machine.

The division stop lever 36 comprises a lever 455 (FIG. 2) pivotally mounted intermediate its length on a pivot screw 456 and having, at its forward end, an upwardly extending handle portion 457 capped by a suitable key top, as shown in FIG. 1, so that the lever can be manually rocked about the pivotal mounting 456. At its rearward end, the lever is provided with a cam edge 458 which engages a bent-over ear 459 on the latch hook 450 so that, when the handle portion 457 of the lever is rocked rearwardly, the hook formation 452 of the latch hook is moved rearwardly away from the stud 453 to release the connecting lever 385 and terminate operation of the machine at the end of the cycle during which the lever 455 is rocked. Means are also provided for actuation by the lever 36, when this lever is rocked forwardly, to latch the latch hook 450 when it rocks to its addition position, so that operation of the machine will be terminated following an overdraft correction after the lever 455 has been manually rocked forwardly. This mechanism is provided to give a true quotient in the quotient register when the division operation is manually terminated but, as it is not important to the operation of the present invention, has not been illustrated in the drawings. A complete disclosure of this mechanism will be found in Patent No. 2,327,981, patented August 31, 1943, by C. M. F. Friden.

The division operation will thus be terminated automatically following an overdraft after the carriage has been moved to its terminal left-hand position, or may be terminated manually either immediately, or after a true quotient has been obtained for the particular ordinal position of the carriage.

As shown in FIGS. 4 and 5, a bellcrank lever 460 is mounted on a pivot pin 461 secured on a bracket 462 which extends from the right frame plate 71. The pin 404 carried by the division connecting lever 385, extends through an opening in the side plate 71 and engages the end of one arm of the bellcrank lever 460 to rock this bellcrank lever, in a clockwise direction as viewed in FIG. 4, when division is tripped off. The other arm of the bellcrank lever 460 extends upwardly and has its end disposed between annular flanges 463 and 464 formed on a sleeve 465 rigidly mounted on the right-hand end portion of a shaft 466. With this arrangement, when division is tripped off, the sleeve 465 and shaft 466 are shifted a predetermined distance to the left when viewed from the front, as in FIG. 5 (to the right in FIG. 4). The shaft 466 extends part way across the machine in a transverse direction and has its left-hand end supported by a bearing bracket 467 (FIG. 5) mounted on the rearward side of the frame cross-member 75. An arm 468 extends forwardly from the flange 463 and, at its forward end, this arm overlies a cam 469 rigidly mounted on the shaft 384. This cam is provided with a single lobe 470 of limited width, and the arm 468 is brought into alignment with this lobe when the shaft 466 is shifted to the left, as described above, and the shaft 384 carrying the cam 469 is shifted to the right for division programming operation. When the shaft 466 is shifted to the left and the shaft 384 is shifted to the right and rotated, the cam lobe 470 will raise the front end of the arm 468 and rock the shaft 466. The cam lobe 470 will not come under the lever arm 468, however, except when the shaft 384 is moved to the right to bring the mutilated programming gear 436 into meshing alignment with its drive gear 440.

A sleeve 471 is slidably mounted on the intermediate portion of the shaft 466 for rotational, or rocking, movement with the shaft. Arms 472 and 473 extend upwardly and rearwardly from the right-hand and left-hand ends of the sleeve 471, respectively. The control arm 472 has a rear end formation adapted to engage a forwardly extending abutment formation 474 on the right shift control yoke 211 for rocking the yoke 211 and engaging the right shift clutch when the shaft 466 is rocked. The control arm 473 has a similar rear end formation adapted to engage a forwardly projecting abutment formation 475 on the left shift yoke 212 for rocking the left shift yoke and engaging the left shift clutch when the shaft 466 is rocked. It will be noted that the distance between the arms 472 and 473 is somewhat greater than the distance between the abutment formations 474 and 475, so that only one of the arms 472 and 473 can engage its corresponding abutment formation at one time. In the position of the parts shown in FIG. 5, the left shift control arm 473 is in alignment with the abutment formation 475 of the left shift control yoke 212 so that, if the shaft 466 were rocked in this position of the parts, the left shift clutch would be engaged. However, when the shaft 466 is shifted to the left, as described above, the arm 473 will be moved to the left out of opposition to the abutment formation 475 and the arm 472 will be brought into alignment with the abutment formation 474, so that if the shaft 466 is rocked when shifted to the left, the right shift clutch will be engaged.

A bracket arm 480 is fixed on the shaft 466 at a location spaced to the left from the arm 473, and a pin 481 extends to the right from this arm and through an aperture in the arm 473 to connect the shaft 466 to the arms 473 and 472 and the sleeve 471, so that the arms 473 and 472 will rock when the shaft is rocked. A spring 482 surrounding the shaft 466 between the fixed bracket 467 and the bracket arm 480, resiliently urges the shaft 466 to the right and returns the shaft to its right-hand, normal, position when the division connecting lever 385 is released to terminate a division operation. A compression spring 483 surrounds the shaft 466 between the arm 473 and the bracket arm 480 and resiliently urges the arms 473 and 472 to the right, away from the bracket arm 480. This spring 483 has less compressive strength than the spring 482 for a purpose which will presently appear.

A latch lever 484 is pivotally mounted intermediate its length on the bracket arm 480 by a pivot pin 485. At its right-hand end, the latch lever 484 is provided with a hook formation 486 which is engageable with the arm 473 to hold this arm to the left relative to the bracket 480, and compress the spring 483. The left-hand end of the latch lever is provided with an abutment formation 487 engaged by an arm 488 (FIGS. 4 and 5) projecting upwardly from the right-hand end of a bail 489 rockably mounted at its ends on the shaft 402. The bail 489 is rocked in response to a true overdraft in the dividend register of the machine, or in response to operation of the left-hand override pawl when the carriage has reached its terminal right-hand position, to rock the latch lever 484 and disengage the hook formation 486 from the arm 473.

With the above-described construction, when the hook formation 486 of the lever 484 is engaged with the arm 473 and the shaft 466 is shifted to the left by the tripping off of division, the arms 472 and 473 will be shifted to the left sufficiently to bring the right shift control arm 472 into alignment with the abutment formation 474 and the left shift control arm 473 out of alignment with the abutment formation 475 to thereby condition the machine for right shift. When the latch lever 484 is rocked to release the arm 473, the spring 483 will move the arms 472 and 473 to the right to recondition the machine for the left shift, as shown in FIG. 5.

An overdraft control slide 490 is slidably mounted at the front side of the frame cross-member 74 by means of spaced-apart, fixed brackets 443 (a forward extension of bracket 467 which supports the end of shaft 466) and 491 extending from the forward side of the frame member. Screws 492 and 493, extending through apertured ears of the fixed brackets and through slots in the slide 490, hold the slide in position and limit the extent of longitudinal movement thereof. At its right-hand end, the slide 490 is provided with a notch 494 engaging the arm 473; and at its left-hand end, the slide is provided with a cam edge 495 inclined upwardly and to the left. The division program initiating flag 406 has a tail formation 496 extending rearwardly from its right-hand end and under the cam formation 495 on the slide 490. When the latch lever 484 is engaged with the arm 473 and the shaft 466 is shifted to the left, the slide 490 will be shifted to the left and its cam edge 495 will engage and rock down the tail formation 496 of the flag 406 against the force of the flag restore spring 497. This will rock the flag to bring the flag finger 407 into the path of the pin 292 to create a false overdraft indication which will move the flag 406 and shaft 384 to the right when the shaft 105e rotates, and start a division program. When the latch lever 484 is released from the arm 473, movement of the arms 472 and 473 and the sleeve 471 to the right by the spring 483 is limited by the length of the slots in the slide 490.

Quotient register sign control mechanism

Since division is a repeated subtraction operation, if the quotient register were operated in like sign relationship it would accumulate subtractively during division and the quotient accumulated in the quotient register at the end of a division operation would be a tens-complement of the true quotient. In order to accumulate an actual, or positive, quotient in the quotient register, it is necessary, during division, to reverse the sign characteristics of the quotient register relative to the operation of the machine. Suitable mechanism for this purpose is shown in FIG. 7, to which reference may now be had, and is fully illustrated and described in Patent No. 2,294,111, patented August 25, 1942, by C. M. F. Friden.

As shown in FIG. 7, the quotient register sign reversing key 30 has a flat stem 500 slidably mounted on the control plate 77 by means of spaced-apart screws 501 and 502 extending through corresponding slots in the key stem. The key is urged to its raised, or normal, position by a spring 503 and carries near its lower end a laterally projecting roller stud 504. When the key 30 is depressed, the roller stud 504 engages one arm of a bellcrank lever 505 rockably mounted at its angle on a fixed pivotal mounting 506 and rocks the bellcrank, in a counter-clockwise direction as viewed in FIG. 7. At its upper end, the bellcrank lever 505 is pivotally connected to the forward end of a link 507, the rear end of which is pivotally connected to the upper end of a counter register reversing lever 508. The lever 508 is pivotally mounted intermediate its length on the control plate 77 by pivot screw 509 and is rocked in a counter-clockwise direction by the link 507 when the key 30 is depressed. A spring 510 urges this lever in a clockwise direction, as viewed in FIG. 7. A reversing shaft 511 for the counter register actuator extends through, and is journalled in, the control plate 77. This shaft carries at the outer side of the control plate a shaft rocking disk 512 provided with diametrically opposite notches 513 and 514. A link 515 is pivotally connected at its rear end to the rear end of the add-subtract control slide 257 by a pivotal connection 516 and is provided at its front end with a semi-circular yoke formation 517 extending partly around the shaft 511. The yoke formation 517 carries, at the ends of its arms, pins 518 and 519 alternatively engageable in the notches 513 and 514, respectively. When the pin 518 is in the notch 513, as shown in FIG. 7, the counter register is conditioned for positive accumulation with the digitating mechanism in additive condition and for negative accumulation with the digitating mechanism in subtractive condition. If the front end of the link 515 is raised to move the pin 518 out of the notch 513 and the pin 519 into the notch 514, the counter or quotient register will then be conditioned for negative accumulation when the digitating mechanism is in additive condition; and positive, or additive, accumulation when the digitating mechanism is in subtractive condition, as it is in division. The lever 508 is provided on its lower end with a rearwardly extending finger formation 520 which underlies the pin 518. When the lever 508 is rocked in a counter-clockwise direction by the link 507, this finger engages the pin 518 and raises the forward end of the link 515, thereby reversing the sign character of the counter register so that, with the digitation mechanism in subtractive condition, the counter will positively accumulate the quotient. A lever 521 is pivotally mounted intermediate its length on the shaft 511 and has near its rear end a slot 522 receiving a pin 523 projecting laterally from the rear end portion of the division connecting lever 385. The front end portion of the lever 521 is provided with a downwardly pointing nose 524, which, when the lever 521 is rocked, in a counter-clockwise direction as viewed in FIG. 7, by upward movement of the rear end of the division connecting lever 385, engages a pin 525 on the lever 508 and holds this lever in position to maintain the sign characteristic of the quotient register throughout the division operation.

Division aligner mechanism

A lever 530 (FIGS. 7, 8 and 9) is pivotally mounted at its lower end on the same pivotal mounting 366 which supports the division actuating lever 365 and extends upwardly from this pivotal mounting. A bellcrank lever 531 is disposed above the lever 365 and forwardly of the lever 530 and is pivotally mounted at its angle on a fixed pivotal mounting 532. A link 533 connects the upper end of the lever 530 to the upper end of an upwardly extending leg 534 of the bellcrank lever 531, a lost motion connection 535 being provided between the link 533 and the bellcrank lever arm 534. The other leg 536 of the bellcrank lever 531 extends forwardly from the pivotal mounting 532 and is connected at its forward end to the lower end of an inverted, L-shaped extension 537 projecting laterally from a rearwardly extending ear 538 on the stem 539 of the right shift control key 27. A spring 540, connected between the pivotal mounting 532 and a stud 541 on the lever 530 near the upper end of this lever, resiliently urges the upper end of the lever 530 in a forward direction. The lever 530 has a tail portion 542 extending rearwardly from the pivotal mounting 366 and this tail portion carries at its rearward end a stud 543 underlying the bottom edge of the rearwardly extending tail portion 544 of the actuating lever 365.

With the above-described arrangement, when the division key is depressed, moving the trigged arm 370 rearwardly so that the roller stud 375 on the front end of the division actuating lever 365 moves from the shoulder 373 to the shoulder 374, the tail portion 544 of the lever 365 is rocked upwardly away from the stud 543, thereby freeing the lever 530 to be rocked forwardly by the spring 540. This forward rocking of the lever 530, acting through the link 533, bellcrank 531 and link 537, pulls the right shift key 27 down to engage the right shift clutch and cycle the machine in the manner described above. This provides a one-order right shift of the carriage immediately following depression of the division key.

The next step in the division alignment procedure is to make a trial subtraction to determine whether or not the dividend and the divisor are in such ordinal relationship that a subtraction of the divisor from the dividend will produce a true overdraft. This initial subtraction is accomplished by the division mechanism of the machine which is conditioned for operation near the beginning of the next machine operating cycle.

The gear 437 carries a stud 545 which engages the lever 530 and rocks this lever rearwardly to its original position near the end of the first, right shift cycle. This raises the right shift key 27 and terminates the right shift operation controlled by this key after the single shift to the right. After the key 27 has been raised, it will be held in raised position by the key interlocking mechanism of the machine when division is fully tripped off at, or near, the beginning of the second cycle.

A lever 546 (FIG. 7) is pivotally connected at its rear end to the lever 530 intermediate the length of the lever 530 by a pivotal connection 547. The lever 546 extends forwardly from the lever 530 and is provided at its front end with a hook formation 548 having a straight bottom edge portion and an upwardly extending shoulder 549 spaced from the front end of the lever. The lever 546 has a downwardly projecting extension 550 carrying at its bottom end a laterally projecting stud 551 resting on the upper edge of the forward portion of the lever 365. A tension spring 552, connected between an upwardly and rearwardly directed tail portion 553 of the lever 546 and the stud 541, resiliently urges the lever 546 to rock downwardly. When the roller stud 375 on the front end of lever 365 moves from the shoulder 373 to the shoulder 374 of the trigger arm 370, lever 365 drops away from the stud 551 and the lever 546 is freed to rock downwardly. A stud 554 on the extension 376 of the trigger arm 370 normally underlies the straight bottom edge of the hook formation 548 on the front end of the lever 546. However, when the trigger arm 370 is rocked rearwardly and the actuating lever 365 is rocked downwardly from the shoulder 373 to the shoulder 374, freeing the lever 530 to rock forwardly, the hook formation 548 moves forwardly and downwardly relative to the stud 554 so that this stud is engaged behind the shoulder 549 of the hook formation. Then, when the lever 530 is restored by the stud 545 on the gear 437, the lever 546 is pulled rearwardly and rocks the trigger arm 370 rearwardly to move the shoulder 374 from under the roller stud 375. The actuating lever 365 (FIG. 7) is then moved downwardly by the spring 367 to rock the division connecting lever 385 (FIG. 6) until the stud 400 on the add-subtract gate control slide 257 is engaged in the notch 397 in the rear end of the lever 385. This starts the division programming operation of the machine, as explained above.

Near the end of the second cycle, after the division key is depressed, the division actuating lever 365 is restored by a stud 560 rotatable with the gear 438 engaging a cam edge 561 at the end of the tail portion 544 of the lever 365 (FIGS. 7, 8, 9 and 10). In order to delay the restoration of the lever 365 until the end of the second cycle, the stud 560 is mounted on a plate 562 (FIGS. 5 and 10) which is rotatable on the axle 439 at the inner, or left-hand, side of the gear 438. The stud projects from the plate 562 through an arcuate slot 563 in the gear 438 and is resiliently held at the leading end of the slot by a tension spring 564. The spring is connected at one end to the stud 560, extends around a collar 565 on the axle 439 and is connected at its other end to the gear 438 by a stud 566. A third stud 568 is disposed substantially diametrically opposite to the stud 560 and extends through an arcuate slot 567 in the gear 438. With this arrangement, the stud 560 will first contact the cam edge 561 substantially at the end of the first cycle, but during the first portion of the second cycle will move rearwardly through the slot 536 until it comes to the trailing edge of the slot, at which time it will rock the lever 365.

When the lever 365 is restored, the trigger arm 370 is returned to its normal, or full-cycle, position, as shown in FIG. 7, by the spring 372.

It will be noted that when the division key is depressed, a pivotally mounted dog 570 (FIG. 2) is rocked in a rearward direction under the urgency of a spring 571 connected between the dog and a pin 572 projecting to the left from the slide 360. The dog 570 is pivotally mounted at its lower end on the right-hand frame side plate 71 and has at its upper end an abutment nose 573 which engages in a notch 574 in the outer edge of the main clutch pawl 116 near the free end of the pawl. Thus, when the division key is depressed the motor switch will be closed but the main clutch is held out of engagement until the division key is released. Therefore, the division key will have been released and raised to its upper position before the first operating cycle of the machine, in division, begins. This will free the slide 360 for return to its forward position by the spring 369 (FIG. 6) and the trigger arm 370 is then free for rocking movement by its return spring 372 to engage the roller stud 375 on the shoulder 373 when the lever 365 is restored by the stud 560. Thus, when the division operation begins, the division key and the right shift key will have both been restored to their normal, upper position and the division actuating lever 365 will have been restored and latched in normal, or inoperative, position. The only connection now maintaining the machine in operation, is the latching-up of the rear end of the division connecting lever 385 by the latch hook 450, as explained above.

The first event which takes place in the first division cycle after the connecting lever 385 has been latched up, is a subtraction of the divisor from the dividend. As has been previously explained, rocking of lever 385 shifts the shaft 466 to the left with the latch 484 engaged with the arm 473. This conditions the machine for right shift by moving the control arm 472 into alignment with the clutch control yoke abutment 474. At this same time, the cam slide 490 rocks the flag 406 to set up a false overdraft indication in the machine. Near the end of this first cycle, the pin 292 engages the flag finger 407 and moves the shaft 384 to the right. This moves the mutilated programming gear 435 into meshing alignment with its drive gear 440 and moves the lobe 470 of the cam 469 under the arm 468.

If this first subtraction creates a true overdraft in the dividend register, this true overdraft will be effective to rock the latch 484 out of engagement with the arm 473 and, with the programming gear 435 already in alignment with its driving gear 440, the second division cycle will result in the addition of the divisor back to the dividend to correct the overdraft. Near the beginning of the third cycle, the add-subtract gate is moved to its centered, or neutral, position and the cam lobe 470 then raises the front end of the lever arm 468 to engage the left shift clutch members 183 and 189 to shift the carriage one order to the left. Since the false overdraft slide 490 was released from the rearwardly extending arm 496 of the flag 406 when the latch lever 484 was released from the arm 473, the false overdraft condition is terminated and, since the programming gear 435 will have been turned to its full-cycle position in which the pin 436 engages in the notch in the gear, the shaft 384 will be moved back to the left and regular division will now proceed with a subtraction cycle during the first portion of the fourth operating cycle of the machine after division was tripped off.

The means for releasing the latch 484 from the arm 473 in response to a true overdraft is shown in FIGS. 5 and 11. The left-hand leg of the bail 489 is extended forwardly past the shaft 402 and provided with an upwardly directed hook formation 575. The link 409 carries a laterally projecting stud 576 engaging the hook formation 575 and acting to rock the bail 489 in a counterclockwise direction about the shaft 402 when the link 409 is moved downwardly and forwardly. The link 409 is moved downwardly and forwardly by the pin 414 when this pin is moved forwardly by the lever 428 in response to an overdraft in the twentieth order of the dividend register, as described above. When the bail 489 is rocked by the stud 576, the arm 488 on the right-hand leg of this bail engages the abutment formation 487 on the left-hand end of the latch lever 484 and rocks this latch lever to release the arm 473.

If the first subtraction cycle after division is tripped off fails to produce a true overdraft in the dividend register, then the carriage will be shifted all of the way to the right by one order per cycle steps, and normal division will then be put into operation to program the carriage to the left until it reaches its terminal left-hand position unless division is manually interrupted. Unless there is a true overdraft as the result of the first subtraction operation, the latch lever 484 will not be released from the arm 473 and the machine will thus be held in right shift condition and the false overdraft indication will also be retained. A cam lever 580 (FIGS. 7 and 8) is fixedly mounted intermediate its length on the right-hand end portion of a shaft 581 extending transversely of the rear portion of the machine and journalled in the right-hand side plate 71 and the control plate 77. This lever has its upper end disposed rearwardly of the mutilated programming gear 435 and is provided with an inclined cam formation 582, which, when the gear 435 is in alignment with its drive gear 440, will move in behind the gear 435 and force this gear further to the right and out of alignment with its drive gear when the lever 580 is rocked in a counter-clockwise direction, as viewed in FIG. 7. A spring 583 connected between the lower end of the lever 580 and a stud 584 projecting from the control plate 77, resiliently urges the lever 580 to rock into engagement with the gear 435. A second lever 585 is rigidly mounted at its lower end on the shaft 581 to the right of the lever 580 and extends upwardly from the shaft substantially parallel to the upper portion of the lever 580. A latch lever 586 is pivotally mounted at its rearward end on a pin 587 and extends forwardly from the pin 587 past the outer side of the lever 585. This latch lever is resiliently urged to rock in a downward direction by a spring 588 and is provided intermediate the length of its lower edge with a transverse shoulder which normally engages a pin 589 on the lever 585 and restrains the spring 583 from rocking the levers 580 and 585 in a counterclockwise direction, as viewed in FIG. 7. The latch lever 586 extends above a pin 590 carried by the tail portion 544 of the division actuating lever 365. When the division actuating lever 365 is rocked to trip off division, the front end of the latch lever 586 is raised to disengage the shoulder of this lever from the pin 589 and free the arms 580 and 585 from this latch. As soon as the latch lever is released from the pin 589, the arms 580 and 585 rock a sufficient amount in a counter-clockwise direction to bring the pin 589 beyond the shoulder of the lever 586, so that the latch lever cannot relatch the pin until the latching engagement is re-established at a proper time in the division programming operation.

A second latch lever 591 is disposed below the lever 586 and rigidly mounted at its rearward end on a shaft 592. This lever 591 extends forwardly from the shaft 592 past the lower portion of the lever 580 and is provided in its lower edge with a transverse shoulder 593 which is engageable with a pin 594 on the lower portion of the lever 580 to restrain this lever against being rocked by the spring 583. A spring detent 595 is mounted on a stud 596 carried by the plate 77 and extends upwardly from the stud past the front end of the lever 591. This detent has vertically spaced-apart recesses which receive the rounded front end of the lever 591 to releasably detent this lever in a position in which the shoulder 593 is clear of the pin 594, as shown in FIG. 7, or in a position in which the shoulder is opposed to the pin, so that the lever 591 will restrain the levers 580 and 585 against rocking in a counter-clockwise direction.

A tripping lever 597 is pivotally mounted intermediate its length on a pivot screw 598 and has its rear end underlying the front end of the lever 591. The front end of the lever 597 carries a laterally projecting stud 599 which underlies the bottom edge of the division actuating lever 365.

With the above-described arrangement, when the division actuating lever is rocked by the spring 367 to trip off division, the latch lever 586 is moved out of engagement with the stud 589 and the latch 591 is moved out of engagement with the stud 594 if it is not already out of engagement with this stud, thereby freeing the levers 580 and 585 for counter-clockwise rocking movement. Even after the levers 580 and 585 are released from the latching levers 586 and 591, they are still held against rocking movement by a timing cam 600 mounted on the right-hand end of the shaft 384. The gear 435 and the cam 600 are both pinned to the shaft 384 so that the cam rotates with the gear 435. The cam 600 has a peripheral portion 601 (FIG. 10) of circular shape terminating at one end in a high point, or lobe, 602. Between the lobe 602 and the opposite end of the circular portion 601 the cam is provided with a low portion 603. A cam following roller 604 is mounted on the upper end of the lever arm 585 and engages the peripheral surface of the cam 600 when the latch levers 586 and 591 are released from the corresponding pins 589 and 594. The angular relationship of the cam 600 to the gear 435 is such that the low portion 603 of the cam is in position to receive the roller 604 only when the gear 435 is in its carriage shift phase position and its teeth are out of mesh with the teeth of its driving gear 440.

If the first subtraction operation produces a true overdraft in the dividend register, this will restore the latch lever 591 to latching engagement with the pin 594 and preclude counter-clockwise rocking of the arms 580 and 585 when the cam low portion 603 comes into registry with the cam following roller 604. It will be noted that at the end of the first subtraction operation, the division actuating lever 365 will have been restored to its upper position with the roller stud 375 on the trigger arm shoulder 373. This will free the lever 597 so that the front end of the lever 591 can be moved downwardly to latch the pin 594. Referring to FIG. 11, a shaft 610 extends transversely of the rear portion of the machine immediately below the rear end of the pin 414 and this shaft is journalled in the left side frame 70 and a bracket, not shown, to the left thereof. A lever arm 611 projects upwardly from the shaft 610 and bears at its upper end against the forward side of the abutment member 431 on the rear end of the pin 414. A second lever arm 612 projects rearwardly from the shaft 610 at the inner, or right-hand, side of the frame plate 70 and this lever arm is connected by a spring-resisted, lost-motion connection 614 to the upper end of a link 615. The lower end of the link 615 is pivotally connected to the rear end of an arm 616, the front end of which is connected to the shaft 592. When the pin 414 is moved forwardly in response to a true overdraft in the dividend register, as described above, the arms 611 and 612 will be rocked in a counter-clockwise direction, as viewed in FIG. 11, raising the link 615. The link 615 will raise the rear end of the arm 616 and rock the shaft 592 in a counter-clockwise direction, as viewed in FIGS. 11 and 7, and this will rock the front end of the arm 591 down to engage the shoulder 593 with the stud 594, thereby latching the arms 580 and 585 against rocking movement.

If the first subtraction operation fails to produce an overdraft in the dividend register, the pin 414 will remain in its rearward position and the shaft 592 will not be rocked. The levers 580 and 585 will then remain free to be rocked in a counter-clockwise direction by the spring 583 when the low portion of the cam 600 moves into registry with the cam following roller 604 on the upper end of the lever 585. As explained above in connection with FIG. 5, the false overdraft indication established by the cam slide 490 will move the programming gear 435 outwardly into register with its drive gear 440 at the end of the cycle in which the first subtraction operation occurs. The latch lever 484, however, will not be released and the shift mechanism will therefore be retained in condition for right shift operation. Under these conditions the programming gear 435 will be turned to add the divisor back to the dividend in the dividend register and will then be turned to its shift phase position. Since the arms 580 and 585 are now free to rock and the cam low portion 603 has been brought into registry with the cam following roller 604, these levers will rock in a counter-clockwise direction, as viewed in FIG. 7, and the inclined cam formation 582 on the upper end of the lever arm 580 will move in behind the programming gear 435 and move this gear to the right and out of registry with its driving gear 440. A plain disk 617 (FIG. 10) having a circular periphery, is mounted on the axle 439 just to the right of the drive gear 440 and this disk has a diameter such that when the programming gear 435 is moved to the right into registry with the disk, the periphery of the disk will extend between two adjacent sets of teeth on the programming gear and hold the programming gear against rotation. The programming mechanism will then be locked in right shift condition with the front end of the arm 468 (FIG. 5) held up by the cam lobe 470 and the right shift clutch continuously engaged. Each machine operating cycle will then shift the carriage one order to the right until the terminal right-hand position of the carriage is reached. During this shifting operation, the levers 580 and 585 will not be rocked because the cam 600 is held stationary.

Referring now to FIGS. 3 and 4, during the machine operating cycle following that in which the carriage reaches its terminal right-hand position, the left-hand override pawl 203 is rocked against the force of its return spring 205 and the abutment formation 618 on the left-hand end of this override pawl, right-hand end as viewed in FIG. 4, engages the stud 236 and rocks the lever arm 237. As explained above, rocking of the lever arm 237 rocks the lever 241 in a clockwise direction, as viewed in FIG. 4, and raises the rear end of lever 246. Raising the rear end of the lever 246 rocks the front end of this lever downwardly (clockwise in FIG. 3), and also rocks downwardly the rear end of lever 249 connected at its rear end to the front end of lever 246. Rocking the rear end of the lever 249 downwardly rocks the front end of the lever upwardly and raises the rear end of the pusher link 234 to disengage the pusher link from the front end of the right shift control rod 213. This frees the spring 220 to disengage the right shift clutch and terminate rotation of the shift pin carrying disk 197.

The lever 246 has, at its front end, a downwardly projecting extension 624 carrying at its lower end a laterally projecting pin, or stud, 625. This stud bears against the upper portion of a lever 626 mounted at its lower end on the shaft 581.

When the lever 246 is rocked by override pawl 203, as explained above, the lever 626 is rocked in a clockwise direction, as viewed in FIG. 3, thereby rocking the shaft 581 and the lever arms 580 and 585 in a clockwise direction, as viewed in FIG. 7. This moves the cam formation 582 on the upper end of the lever arm 580 from behind the programming gear 435 and frees this gear to be returned by the spring 441 into alignment with its drive gear 440. This movement of the lever 585 is not sufficient to relatch the stud 589 with the latch arm 586 but, when the programming gear 435 is now turned through the remaining 120° of its program movement to restore the division mechanism to subtractive condition, the lobe 602 of the cam 600 will engage the cam following roller 604 and move the arm 585 rearwardly, a distance sufficient for the latch lever 586 to relatch the stud 589 and hold the lever arms 580 and 585 in retracted position. The latch arm 591 will remain detented in position out of engagement with the corresponding stud 594 until a true overdraft occurs in the dividend register, at which time this lever will also be moved down into latching engagement with its stud, as explained above.

Referring again to FIG. 4, it will be noted that the lever 241 has a third arm 630 which extends to the left, to the right as viewed in FIG. 4, from the mounting pin 242 for this lever. At its left-hand end, the lever 630 overlies a stud 631 carried on the rear end of a lever 632 pivotally mounted intermediate its length on a fixed pivot screw 633 disposed rearwardly of the bottom edge of the rear frame cross-member 76 (FIG. 5). At its front end, the lever 632 bears against the rear side of a tongue 634 projecting upwardly and rearwardly from the top edge of the bail 489. With this arrangement, when the lever 241 is rocked by the override pawl 203, the lever 632 is rocked and rocks the bail 489. This rocking of the bail 489 moves the bail arm 488 against the left-hand end of the latch lever 481 and releases the hook 486 at the right-hand end of this lever from the shift control arm 473, so that the first overrun of the mechanism following the movement of the carriage to its terminal right-hand position, will establish a division programming operation with a one-order left shift of the carriage. In other words, normal division operation will be established after the carriage has been moved to its terminal right-hand position.

If the machine were to be manually stopped while in the process of shifting the carriage to its terminal, right-hand position, this would leave the machine in a condition in which normal operation could not be resumed until the right-hand shift had been completed and operation of the machine discontinued while the machine was in normal division operation. As this would constitute an undesirable operating condition, means have been provided to insure that the right shift operation will be completed and the machine started on normal division before the operation can be manually terminated. Referring to FIG. 7, a lever arm 640 is pivotally mounted at its lower end on the pivot pin, or shaft, 587 which supports the latch lever 586, the lever extending upwardly from this pivotal mounting. A slotted link 641 is pivotally connected at one end to the upper end of the lever arm 580 and extends rearwardly from this lever arm. A pin 642 on the arm 640 extends through the slot in the link 641 and a tension spring 643 is connected between the pin 642 and the pivotal mounting 644 between the link 641 and the lever 580. The upper end of the lever 640 is provided with a cam edge 645 terminating rearwardly in an upwardly projecting shoulder, or finger, 646. The latch lever 521 is extended rearwardly and a pin 647 projects laterally from the rear end of this extension and normally bears against the front edge of the lever arm 640, as shown in FIG. 7. When the rear end of the division connecting lever 385 is raised to establish division operation of the machine, the pin 647 is moved to a position above the cam edge 645 of the lever arm 640. When, after division has been tripped off, the lever 580 is rocked to move the programming gear 435 to the right and establish right shift operation of the machine carriage, the upper end of the arm 640 is pulled under the pin 647 and the connecting lever 385 cannot then rock to release the stud 400 and discontinue operation of the machine by opening the motor switch and disengaging the main clutch, until the upper end of the arm 640 has been moved rearwardly from under the pin 647. Thus, if division operation is started with the dividend extending to the left of the divisor, the division operation cannot be manually terminated until the carriage has been fully moved to its terminal right-hand position and normal division operation has been established from this position of the carriage.

Operation

As indicated above, the present invention has been illustrated and described as applied to the well-known Friden calculating machine. In previous automatic dividend and division aligning arrangements provided in this machine, after initiation of the division operaton, in some arrangements, the carriage was invariably shifted to its terminal right-hand position before division programming began. In other arrangements, the right shift was controlled by elaborate mechanism for sensing the highest order significant digit in the dividend and the divisor. While in still other arrangements, the carriage was stepped to the right by three cycle division programming operations until a true overdraft occurred in the dividend register as a result of a subtraction phase of a division programming action or, until the carriage reached its terminal right-hand position. The first indicated arrangement always makes the full right shift regardless of the initial alignment condition of the divisor and the dividend. The second arrangement requires the addition to the machine of complicated and highly sensitive ordinal sensing mechanism. The third, shown in the Machado et al. Patent No. 2,653,765, requires three machine operating cycles for each ordinal step of the carriage to the right until alignment is obtained or the carriage reaches its terminal right-hand position.

The mechanism herein disclosed provides for immediately sensing whether the dividend in the dividend or product register is in alignment with, or to the right of, the divisor in the selection mechanism, or whether the dividend is to the left of the divisor. If the dividend is in proper alignment with, or to the right of the divisor to start with, the mechanism herein disclosed will cause a single order shift of the carriage to the right to produce a true overdraft on the first subtraction cycle and will immediately condition the division mechanism for normal division. The first normal division operation will be one or more three-cycle programming operations to step the carriage to the left until a position is reached, at which an overdraft does not occur on the first subtraction cycle, whereupon the normal division operation will continue until the division is completed or manually terminated. If the dividend is found to be to the left of the divisor so that an overdraft is not produced by the first subtraction cycle after the initial one-order shift of the carriage to the right, the mechanism of the present invention latches the division mechanism in right shift condition so that the carriage is shifted to the right one order for each cycle of the machine until the terminal, right-hand position of the carriage is reached, whereupon the division mechanism is automatically changed to normal division operation with ordinal left shifting of the carriage. This normal division operation is continued from the terminal right-hand position of the carriage to the terminal left-hand position of the carriage unless division is manually terminated after the carriage has been moved at least one order from its terminal right-hand position. Means are provided to disable the manual division stop lever while the carriage is shifting to the right or is in its terminal right-hand position so that the machine cannot be left latched in right shift condition.

As herein above described, the mechanism includes an extended tens-transfer or full-carry mechanism and senses the overdraft from the highest order of the dividend register. This precludes the production of an erroneous quotient which might otherwise occur if there were an outboard digit in the dividend register with one or more zeros between this outboard digit and the highest order of the regular tens-transfer mechanism operated by the actuating mechanism of the machine.

I claim:

1. In a caculating machine having an ordinally arranged selection mechanism and an ordinally arranged accumulator register mechanism movable relative to each other, shifting means for shifting the relative ordinal positions of one of said mechanisms, an actuating mechanism, division mechanism for dividing a dividend in the accumulator register by a divisor in the selection mechanism by the method of repeated subtraction of the divisor from the dividend in successive ordinal series of operations, and a division programming mechanism including means for sensing an overdraft in the accumulator register and means operated thereby for controlling operation of said actuating means and said shifting means, a manually operated control member, a mechanism operated by said control member and driven by said actuating mechanism to operate said shifting means to effect a single relative ordinal movement of said accumulator register and said selection mechanism in a direction to relatively increase a value set in the selection mechanism and then operate said actuating mechanism to make a single subtraction of the value set in the selection mechanism from the value in said accumulator register, means operated upon failure of operation of said overdraft responsive means during such single subtraction operation to operate said shifting means to effect relative movement of said product register and said selection mechanism in a direction to relatively increase the value set in the selection mechanism to an extreme ordinal position, and means operated by operation of said overdraft sensing means during such single subtraction operation for disabling said shifting means and enabling said division mechanism.

2. In a calculating machine having a selection mechanism and a product register mechanism movable relative to each other, means for shifting one of said mechanisms relative to the other in either direction, actuating mechanism, division control mechanism for dividing a dividend in the product register by a divisor in the selection mechanism by the method of repeated subtraction of the divisor from the dividend in successive ordinal series of operations, means for sensing an overdraft in the product register, and a division control key, mechanism operated by said division control key for operating the shifting means to effect a single shift of the movable one of said mechanisms in a direction to increase the value of the divisor with respect to the dividend and for operating said actuating mechanism to effect a single subtraction of the divisor from the dividend and immediately add the divisor to the dividend, means for holding said shifting means effective to continue said shifting operation in the same direction, means operated by the overdraft sensing mechanism for disabling said holding means and enabling operation of said division control mechanism, whereby upon the failure of the single subtraction operation to create an overdraft in said product register mechanism said holding means operates said shift mechanism in a direction to effect an increase in the value of the divisor to a predetermined ordinal position of the selection mechanism with respect to said product register mechanism, so that a division operation is prevented and the shifting means shifts the one mechanism to the predetermined position if the dividend is misaligned to the left of the divisor, but not otherwise.

3. In a calculating machine having an ordinally arranged selection mechanism, an ordinally arranged dividend register longitudinally shiftable in either direction relative to said selection mechanism, a register shifting mechanism, cyclically operable actuating mechanism operable additively or subtractively, an overdraft sensing mechanism in said dividend register, a division key, and a division mechanism for dividing a dividend in said dividend register by a divisor in said selection mechanism by the method of repeated subtraction of the divisor from the dividend in successive ordinal series of operations, a dividend-divisor aligning mechanism comprising means operated by said key and driven synchronously with the cycles of operation of said actuating mechanism to first operate said register shifting mechanism to shift said register one order to the right, and then operate said actuating mechanism to effect a single cycle of subtraction followed immediately by an additive corrective cycle and then operating said shifting mechanism, latch means for holding said shifting mechanism in a right shift condition, and means operated upon operation of said overdraft sensing means for releasing said latch and initiating operation of said division control means and operated upon failure of said overdraft sensing means to sense an overdraft during said single subtractive cycle to continuously operate said shifting means.

4. In a calculating machine having an ordinally arranged dividend register, an ordinally arranged selection mechanism, an ordinally arranged actuating means operative to enter a value in said selection mechanism into said register additively or subtractively, means for shifting said dividend register transordinally relative to said actuating means including a power-operated right shift drive and a left shift drive for said register, a positionable shift initiating means for operating one of said shift drives and normally biased to a left shift position, means for operating said shift initiating means, a division key, and a division control mechanism for initiating continuous operaton of said actuating means subtractively, an overdraft sensing means and a program control means operated by said overdraft sensing means for operating said actuating means additively to correct said overdraft, then operate said shift means, and then reinitiate continuous operation of said actuating means subtractively: a dividend and divisor aligning mechanism comprising means operated by said key for moving said shift initiating means into said right shift position, initiate operation of said operating means and then initiate a single subtraction operation and simultaneously simulate operation of said overdraft sensing means, means with the shift initiating means in the right shift position, means for holding said shift initiating means in said right shift position and thereby effect continuous right shift operations, means operated by an attempted shift of said carriage beyond its terminal right-hand position for terminating said shifting operation and releasing said holding means, and means operated by the overdraft sensing means sensing an overdraft in said dividend register as the result of the single subtraction operation to position said carriage shift initiating means from right shift to left shift condition and release said holding means, thereby initiating a normal division operation.

5. In a calculating machine having key-operated selection mechanism, an ordinally arranged dividend register longitudinally shiftable to the right and left relative to said selection mechanism, actuating means controlling the additive or subtractive entry of values from said selection mechanism into said dividend register, register shifting mechanism selectively controlled to effect a single order or plural order left-hand or a right-hand shift of said register, division control means effective to establish a repetitive subtraction operation of the machine, division programming mechanism including means for sensing an overdraft in said dividend register and means operated thereby to establish an operating program including at least one additive cycle and a shift of the carriage one ordinal space to the left followed by a resumption of divisional operation of the machine, manually actuatable initiating means, and manually actuatable division stop means, a dividend and divisor aligning mechanism comprising means operated by said initiating means to operate said shifting mechanism for a single order right shift of said carriage and then initiate operation of said actuating means for a single subtractive cycle, means responsive to operation of said overdraft sensing means in sensing an overdraft in said dividend register as the result of the single subtraction cycle to change said carriage shift mechanism from right shift to left shift condition and to initiate division operation, means actuated upon failure of the overdraft sensing means to sense an overdraft in said dividend register as a result of the single subtraction cycle to operate said shift mechanism in continuous right shift operations and hold said division programming mechanism disabled, and means operated upon an attempted shift of said carriage beyond its terminal right-hand position for terminating said shifting operation and initiating a division operation, and means effective during continuous right shift of said carriage to disable said manually actuatable division stop means.

6. In a calculating machine having key-operated selection mechanism, an ordinally arranged dividend register longitudinally shiftable to the right and left relative to said selection mechanism, actuating mechanism operative to enter a value in said selection mechanism into said dividend register additively or subtractively, register shifting mechanism selectively controlled to effect a single order or plural order left-hand or a right-hand shift of said carriage, tens-transfer mechanism operative to carry tens-transfers to the highest order of said dividend register, division control means effective to establish a repetitive subtraction operation of the machine, and division programming mechanism effective in response to an overdraft in said product register to establish an operating program including an additive cycle to restore the overdraft, a shift of the carriage one ordinal space to the left and a resumption of the subtractive operation of the machine, and a control key, a dividend and divisor aligning mechanism comprising means operated by said control key to initially operate said shift mechanism for a one-order shift of said carriage to the right and then initiate a first subtraction operation, means operated upon an overdraft carried to the highest order of said dividend register as the result of the subtraction operation to immediately initiate operation of said division programming mechanism with its left shifting of said carriage and operated upon failure of the subtraction operation to produce an overdraft in said dividend register to initiate continuous right shifts of said carriage, and means operated upon an attempted shift of said carriage beyond its terminal right-hand position for terminating said shifting operation and simultaneously initiate continuous subtraction operations under the control of said division programming mechanism.

7. In a calculating machine having an ordinally arranged dividend register, an ordinally arranged selection mechanism, an ordinally arranged actuating means cyclically operative to enter a value in said selection mechanism into said register additively or subtractively, means for shifting said dividend register transordinally relative to said actuating means including a power-operated right shift drive and a left shift drive for said register, a positionable shift control means for operating one of said shift drives and normally biased to a left shift position, override means operated by an attempted shift of said dividend register beyond a terminal position, a control key, and a division control mechanism for initiating continuous operation of said actuating means subtractively, an overdraft sensing means and a program control means operated by said overdraft sensing means for operating said actuating means additively to correct said overdraft, then operate said shift control means, and then reinitiate continuous operation of said actuating means subtractively, a control key, and a stop key effective to terminate the division operation at any time, a dividend and divisor aligning mechanism comprising means operated by actuation of said control key to initially operate said shift initiating means for a one-order shift of said carriage to the right and then initiate a single subtraction operation, means for retaining said shift control means in its right shift condition, means responsive to an overdraft carried to the highest order of said dividend register as the result of the single subtraction operation to release said shift control means from its right shift condition and enable it to return to its left shift condition and simultaneously initiate operation of said division control mechanism, means operated upon failure of the single subtraction operation to produce an overdraft in the highest order of said register to operate said shift control means in a continuous right shift of said dividend register, means operated by said override means for terminating operation of said shift control means and simultaneously initiating continuous cycles of subtraction under control of said division control mechanism, and means rendered effective during the shifting of said carriage to its right-hand position to disable said stop key.

References Cited in the file of this patent
UNITED STATES PATENTS

| 2,365,507 | Allen | Dec. 19, 1944 |
| 2,636,677 | Gang | Apr. 28, 1953 |
| 2,653,762 | Ellerbeck | Sept. 29, 1953 |
| 2,653,763 | Hopkins | Sept. 29, 1953 |
| 2,653,764 | Hopkins | Sept. 29, 1953 |
| 2,653,765 | Machado | Sept. 29, 1953 |
| 2,666,580 | Hopkins | Jan. 19, 1954 |
| 2,710,141 | Avery | June 7, 1955 |
| 2,722,377 | Davis | Nov. 1, 1955 |
| 2,809,796 | Hopkins | Oct. 15, 1957 |